(12) United States Patent
Taka

(10) Patent No.: US 9,778,402 B2
(45) Date of Patent: Oct. 3, 2017

(54) LIGHT REFLECTIVE FILM AND LIGHT REFLECTOR PRODUCED USING THE SAME

(71) Applicant: Konica Minolta, Inc., Tokyo (JP)

(72) Inventor: Yukako Taka, Tokyo (JP)

(73) Assignee: KONICA MINOLTA, INC., Tokyo (JP)

(*) Notice: Subject to any disclaimer, the term of this patent is extended or adjusted under 35 U.S.C. 154(b) by 96 days.

(21) Appl. No.: 14/419,563

(22) PCT Filed: Aug. 6, 2013

(86) PCT No.: PCT/JP2013/071229
§ 371 (c)(1),
(2) Date: Feb. 4, 2015

(87) PCT Pub. No.: WO2014/024873
PCT Pub. Date: Feb. 13, 2014

(65) Prior Publication Data
US 2015/0219810 A1    Aug. 6, 2015

(30) Foreign Application Priority Data

Aug. 6, 2012  (JP) .................... 2012-174378

(51) Int. Cl.
*G02B 5/20* (2006.01)
*G02B 5/28* (2006.01)
(Continued)

(52) U.S. Cl.
CPC ............ *G02B 5/287* (2013.01); *B32B 27/308* (2013.01); *B32B 27/36* (2013.01); *C03C 17/366* (2013.01);
(Continued)

(58) Field of Classification Search
CPC ........ G02B 5/287; G02B 5/08; G02B 5/0816; G02B 5/085; G02B 5/0858; G02B 5/0866;
(Continued)

(56) References Cited

U.S. PATENT DOCUMENTS 5,513,040 A * 4/1996 Yang .................. G02B 5/20
                                                        359/585
6,391,400 B1 * 5/2002 Russell ................ B32B 17/10
                                                         296/84.1

(Continued)

FOREIGN PATENT DOCUMENTS

EP    1498259 A1    1/2005
EP    1775120 A1    4/2007
(Continued)

OTHER PUBLICATIONS

International Preliminary Report on Patentability dated Feb. 19, 2015 for PCT Application No. PCT/JP2013/071229 and English translation.

(Continued)

*Primary Examiner* — Bumsuk Won
*Assistant Examiner* — William R Alexander
(74) *Attorney, Agent, or Firm* — Lucas & Mercanti, LLP

(57) ABSTRACT

The light reflective film has improved adhesive property between a light reflective layer and a hard coat layer. The light reflective film has a high refractive index layer, a low refractive index layer, a resin adhesive layer, and a hard coat layer laminated on a substrate, in this order. The hard coat layer has an active energy ray-curable resin. The resin adhesive layer has at least one resin selected from polyvinyl acetal resins, acrylic resins, and urethane resins.

14 Claims, 2 Drawing Sheets

(51) Int. Cl.

| | | |
|---|---|---|
| *G02B 5/08* | (2006.01) | |
| *B32B 27/30* | (2006.01) | |
| *B32B 27/36* | (2006.01) | |
| *G02B 1/14* | (2015.01) | |
| *C08K 3/22* | (2006.01) | |
| *C08K 3/36* | (2006.01) | |
| *C09J 129/14* | (2006.01) | |
| *G02B 1/04* | (2006.01) | |
| *G02B 1/12* | (2006.01) | |
| *C03C 17/36* | (2006.01) | |

(52) U.S. Cl.
CPC .................. *C08K 3/22* (2013.01); *C08K 3/36* (2013.01); *C09J 129/14* (2013.01); *G02B 1/04* (2013.01); *G02B 1/12* (2013.01); *G02B 1/14* (2015.01); *G02B 5/0841* (2013.01); *G02B 5/20* (2013.01); *G02B 5/282* (2013.01); *B32B 2250/42* (2013.01); *B32B 2307/416* (2013.01); *B32B 2307/418* (2013.01); *B32B 2551/00* (2013.01); *C08K 2003/2227* (2013.01); *C08K 2003/2244* (2013.01)

(58) Field of Classification Search
CPC ...... G02B 5/0883; G02B 5/281; G02B 5/282; G02B 5/0841; G02B 1/14; G02B 1/04; G02B 1/12; G02B 5/20; C03C 17/3663; C03C 17/366
USPC ....... 359/584, 577, 580, 581, 585, 586, 588, 359/589, 559, 560
See application file for complete search history.

(56) References Cited

U.S. PATENT DOCUMENTS

| | | | | |
|---|---|---|---|---|
| 6,777,070 | B1* | 8/2004 | Murata | C08F 259/08 428/323 |
| 6,849,327 | B1* | 2/2005 | Ikuhara | C09D 125/10 428/339 |
| 6,950,236 | B2 | 9/2005 | Hokazono | G02B 1/111 349/137 |
| 7,285,323 | B2* | 10/2007 | Sone | G02B 5/30 349/122 |
| 7,521,126 | B2* | 4/2009 | Taki | B32B 27/08 428/480 |
| 2002/0025441 | A1* | 2/2002 | Hieda | B32B 17/10018 428/440 |
| 2003/0134105 | A1* | 7/2003 | Toshine | G03H 1/0248 428/323 |
| 2004/0052080 | A1* | 3/2004 | Hieda | B32B 15/06 362/382 |
| 2004/0204555 | A1* | 10/2004 | Noda | C08F 220/18 526/242 |
| 2006/0093786 | A1* | 5/2006 | Ohashi | C08J 7/04 428/131 |
| 2006/0227439 | A1* | 10/2006 | Taki | B32B 27/08 359/883 |
| 2007/0244221 | A1 | 10/2007 | Ueda et al. | |
| 2007/0285777 | A1* | 12/2007 | Toyoshima | G02B 1/105 359/487.05 |
| 2008/0075895 | A1* | 3/2008 | Yamaki | G02B 1/105 428/1.33 |
| 2008/0233312 | A1* | 9/2008 | Nakamura | G02B 1/105 428/1.31 |
| 2009/0036636 | A1* | 2/2009 | Tsuji | C08F 8/28 528/232 |
| 2009/0237786 | A1* | 9/2009 | Yoshihara | G02B 1/105 359/485.01 |
| 2010/0210772 | A1* | 8/2010 | Hiwatashi | C09J 133/08 524/407 |
| 2011/0151146 | A1* | 6/2011 | Okano | C08J 7/04 428/1.33 |
| 2011/0181820 | A1 | 7/2011 | Watanabe | |
| 2012/0114873 | A1* | 5/2012 | Yosomiya | G02B 5/3033 427/536 |

FOREIGN PATENT DOCUMENTS

| | | |
|---|---|---|
| EP | 2667226 A2 | 11/2013 |
| JP | 61-225268 A | 10/1986 |
| JP | 05-232311 A | 9/1993 |
| JP | 09-178927 A | 7/1997 |
| JP | 2008-209598 A | 9/2008 |
| JP | 2009-086659 A | 4/2009 |
| JP | 2009-143999 A | 7/2009 |
| JP | 2012-071446 A | 4/2012 |
| WO | WO 2005-087870 A1 | 9/2005 |
| WO | 2012098971 A1 | 7/2012 |

OTHER PUBLICATIONS

Extended European Search Report dated Feb. 8, 2016; Application No./U.S. Pat. No. 13827674.6-1562/2881769 PCT/JP2013071229; Applicant: Konica Minolta, Inc.; total of 9 pages.

Office Action dated May 26, 2016 from the corresponding Chinese Application; Application No. 201380041618.6; Applicant: Konica Minolta, Inc.; English translation of Office Action; Total of 14 pages.

Notification of Reasons for Refusal dated Sep. 13, 2016 from corresponding Japanese Application; Patent Application No. 2014-529505; Translation of Notification of Reasons for Refusal; Total of 6 pages.

Official Decision of Refusal dated May 9, 2017 from the corresponding Japanese Application No. JP 2014-529505 and English translation; English translation of Official Decision of Refusal: Total of 4 pages.

* cited by examiner

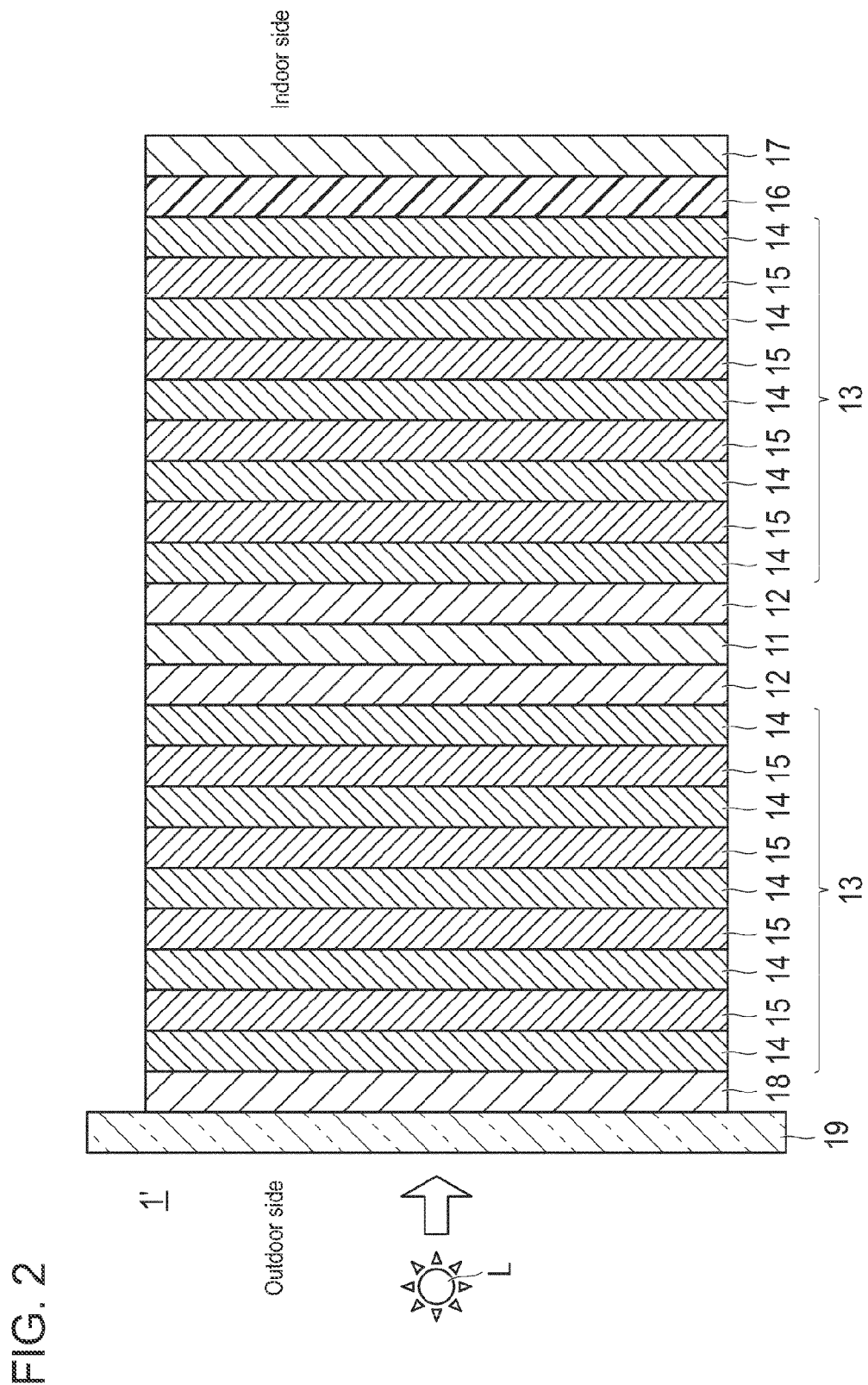

LIGHT REFLECTIVE FILM AND LIGHT REFLECTOR PRODUCED USING THE SAME

CROSS REFERENCE TO RELATED APPLICATION

This Application is a 371 of PCT/JP2013/071229 filed on Aug. 6, 2013 which, in turn, claimed the priority of Japanese Patent Application No. JP2012-174378 filed on Aug. 6, 2012, both applications are incorporated herein by reference.

TECHNICAL FIELD

The present invention relates to a light reflective film and a light reflector produced using the same.

BACKGROUND ART

In recent years, it has been theoretically demonstrated that a laminated film in which a light reflective layer comprising a high refractive index layer and a low refractive index layer is disposed on a substrate selectively reflects light having a specific wavelength. Hence, the laminated film has been used in various applications as a light reflective film to shield light having a predetermined wavelength. For example, the laminated film which shields infrared rays to become heat rays while transmitting visible light is used in a window of buildings or a member for vehicle as an infrared shielding film.

As such an infrared shielding film, for example, an infrared reflective film (infrared shielding film) constituted by alternately laminating a high refractive index layer and a low refractive index layer on a substrate is disclosed in Patent Literature 1. It is disclosed that, in this case, at least either the high refractive index layer or the low refractive index layer comprises metal oxide particles, a lithium compound, and a water-soluble polymer. In addition, it is described in Patent Literature 1 that the infrared reflective film can reflect infrared rays and has high visible light transmittivity, heat shielding performance, light resistance, and radio wave transmittivity. Moreover, it is described in Patent Literature 1 that the infrared reflective film is used as a sheet or film bonded to a window for vehicle or building via an easy adhesive layer for the purpose of imparting heat shielding property.

Incidentally, generally speaking, when a film is used in an intended purpose, for example, a window of buildings or vehicle members, a hard coat layer is formed in order to prevent damage or the like on the surface at the time of cleaning or the like. As used in the hard coat layer, for example, a composition for hard coat is described in Patent Literature 2, which comprises (A) an active energy ray-curable silicone-acrylic copolymer; (B) an active energy ray-curable multifunctional compound; and (C) an electrically conductive material, the composition for hard coat in which (A) the active energy ray-curable silicone-acrylic copolymer has (a-1) a polysiloxane block having a predetermined structure, (a-2) an active energy ray-curable double bond group-containing acrylic block, and (a-3) a fluoroalkyl group-containing acrylic block. It is described in Patent Literature 2 that the hard coat layer formed from the composition for hard coat is excellent in antifouling property, antifouling durability, scratch resistance, abrasion resistance, and antistatic property.

CITATION LIST

Patent Literature

Patent Literature 1: Japanese Patent Application Laid-Open No. 2012-71446
Patent Literature 2: Japanese Patent Application Laid-Open No. 2009-143999

SUMMARY OF INVENTION

Technical Problem

It has been revealed that adhesion between the light reflective layer and the hard coat layer is insufficient when the hard coat layer comprising the active energy ray-curable resin described in Patent Literature 2 or the like is formed on the light reflective layer laminated with the refractive index layer according to Patent Literature 1 in order to prevent scratches and the like.

Therefore, the purpose of the invention is to provide a light reflective film having improved adhesion between a light reflective layer and a hard coat layer.

Solution to Problem

The inventors made intensive researches, and as a result, they found that the problem of the invention can be solved by providing a resin adhesive layer comprising a predetermined resin between a light reflective layer and a hard coat layer, thereby completing the invention.

In other words, the problem of the invention is achieved by the following means.

(1) A light reflective film laminated on a substrate with a light reflective layer comprising a high refractive index layer and a low refractive index layer, a resin adhesive layer, and a hard coat layer in this order, wherein the hard coat layer comprises an active energy ray-curable resin, and a resin adhesive layer comprises at least one member selected from the group consisting of polyvinyl acetal resins, acrylic resins, and urethane resins;

(2) The light reflective film according to (1), wherein the resin adhesive layer comprises a polyvinyl acetal resin;

(3) The light reflective film according to (2), wherein an acetalization rate of the polyvinyl acetal resin is 15 to 50 mol %;

(4) The light reflective film according to any one of (1) to (3), wherein the resin adhesive layer further comprises metal oxide particles;

(5) The light reflective film according to any one of (1) to (4), wherein the resin adhesive layer further comprises a zirconium compound; and (6) A light reflector comprising a base substance and the light reflective film according to any one of (1) to (5) disposed on at least one surface of the base substance.

Advantageous Effects of Invention

According to the invention, it is possible to provide a light reflective film in which adhesion of a hard coat layer to a light reflective layer is improved.

BRIEF DESCRIPTION OF DRAWINGS

FIG. 2 is a schematic cross-sectional view illustrating general structure of an infrared shielding body used in another embodiment of the invention.

DESCRIPTION OF EMBODIMENTS

Figure 1:
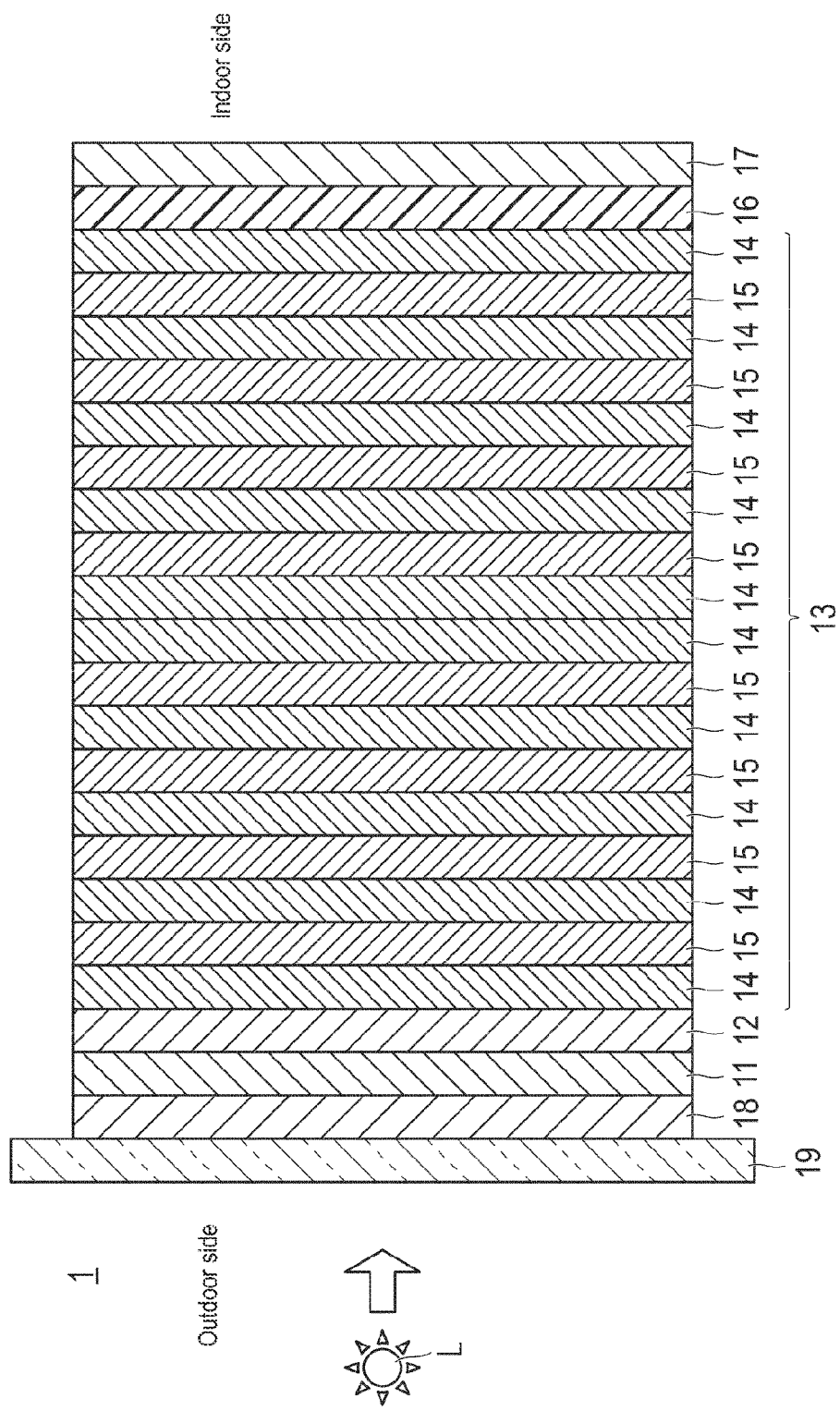
FIG. 1 is a schematic cross-sectional view illustrating general structure of an infrared shielding body used in one embodiment of the invention.

Hereinafter, embodiments of the invention will be described in detail.

According to one embodiment of the invention, a light reflective film is provided, which a light reflective layer comprising a high refractive index layer and a low refractive index layer, a resin adhesive layer, and a hard coat layer are laminated on a substrate in this order. At this time, the hard coat layer comprises an active energy ray-curable resin. In addition, the resin adhesive layer comprises at least one member selected from the group consisting of polyvinyl acetal resins, acrylic resins, and urethane resins.

A ray of light which is reflected by the light reflective film can be adjusted by appropriately controlling an optical film thickness or the like of the light reflective layer. At this time, for example, it can be an ultraviolet shielding film in the case of reflecting the rays of light having a wavelength of 200 to 400 nm (ultraviolet rays), it can be a visible light colored film in the case of reflecting the rays of light having a wavelength of 400 to 700 nm (visible light), and it can be an infrared shielding film in the case of reflecting the rays of light having a wavelength of 700 to 1200 nm (infrared rays). In addition, the light reflective film can be a metallic luster film by appropriately designing the optical film thickness or the like of the light reflective layer so as to control the wavelength and reflectivity of the rays of light reflected.

Among others, the rays of light which the light reflective film can shield are preferably the rays of light in the region from ultraviolet rays to infrared rays having a wavelength of 200 nm to 1000 μm, more preferably the rays of light having a wavelength of 250 to 2500 nm, and more preferably the rays of light in the near infrared region having a wavelength of 700 to 1200 nm.

An infrared shielding film will be described as a representative example of the light reflective film in the following description; however, it is not intended to limit the invention.

<Infrared Shielding Film>

An infrared shielding film is formed by laminating an infrared reflective layer including a high refractive index layer and a low refractive index layer, a resin adhesive layer, and a hard coat layer in this order on a substrate. At this time, the infrared reflective layers may be provided on both surfaces of the substrate.

The thickness of the infrared shielding film of the present embodiment is preferably from 12 to 315 μm, more preferably from 15 to 200 μm, and even more preferably from 20 to 100 μm.

In addition, as the optical characteristics of the infrared shielding film of the present embodiment, the transmittance in the visible light region indicated by JIS R3106-1998 is 50% or more, preferably 75% or more, and more preferably 85% or more, and it is preferable to have a region where a reflectivity exceeds 50% in the wavelength region of 900 nm to 1400 nm.

<Substrate>

A substrate used in an infrared shielding film is not particularly limited as long as it is transparent. Examples of such a substrate may include a film formed of resin such as methacrylic acid ester, polyethylene terephthalate (PET), polyethylene naphthalate (PEN), polycarbonate (PC), polyarylate, polystyrene (PS), aromatic polyamide, polyether ether ketone, polysulfone, polyether sulfone, polyimide, and polyetherimide, and further a resin film or the like formed by laminating the above resin into two or more layers. It is preferable to use polyethylene terephthalate (PET), polyethylene naphthalate (PEN), and polycarbonate (PC) from the viewpoint of cost and easy availability.

The thickness of the substrate is preferably from 5 to 200 μm and more preferably from 15 to 150 μm. It is preferable that the total film thickness is within the above range when the substrate is laminated.

The visible light transmittance of the substrate is preferably 85% or more and more preferably 90% or more. The visible light transmittance of the substrate is preferably 85% or more from the viewpoint that the visible light transmittance of the infrared shielding film becomes 50% or more. Note that, in the present specification, "visible light transmittance" means the transmittance in the visible light region indicated by JIS R3106-1998.

In addition, the above substrate may be an unstretched film or a stretched film; however, it is preferably a stretched film from the viewpoint of the improvement in strength and suppressing thermal expansion.

In addition, it is preferable that the substrate is provided with an undercoat layer on one or both surfaces thereof in a film forming process. The undercoat layer may be formed in-line or after the film formation. As the method of forming the undercoat layer, for example, there is provided a method in which an undercoat layer coating liquid is coated and the coating film thus obtained is dried. The undercoat layer coating liquid usually comprises resin. Examples of the resin may include polyester resin, acrylic-modified polyester resin, polyurethane resin, acrylic resin, vinyl resin, vinylidene chloride resin, polyethyleneimine vinylidene resin, polyethyleneimine resin, polyvinyl alcohol-based resin, modified polyvinyl alcohol-based resin, and gelatin. A known additive may be further added to the undercoat layer coating liquid. It is preferable to coat that the coating amount of the undercoat layer coating liquid is about 0.01 to 2 $g/m^2$ in the dry state. The method of coating the undercoat layer coating liquid is not particularly limited, and it is possible to use known methods such as roll coating method, gravure coating method, knife coating method, dip coating method, and spray coating method. The coating film thus obtained may be stretched, and the undercoat layer can be usually formed by applying the coating liquid and then drying at 80 to 120° C. while performing transverse stretching within a tenter. The undercoat layer may be a single layer structure or a laminated structure.

The substrate according to the invention may further have known functional layers such as electrically conductive layer, antistatic layer, gas barrier layer, antifouling layer, deodorant layer, droplet flowing layer, easily slippery layer, abrasion resistant layer, and intermediate film layer.

The total film thickness of the substrate and the intermediate layer is preferably from 5 to 200 μm and more preferably from 15 to 150 μm when the substrate has an intermediate layers such as the undercoat layer, or functional layer and the like described above.

<Infrared Reflective Layer>

An infrared reflective layer comprises a high refractive index layer and a low refractive index layer. The infrared reflective layer may have structure which comprises at least one laminate (unit) constituted by a high refractive index layer and a low refractive index layer; however, it is preferable to have a form in which the high refractive index layers and the low refractive index layers are alternately plurally laminated. In this case, the top layer and bottom layer of the infrared reflective layer may be either the high refractive index layer or the low refractive index layer; however, both of the top layer and the bottom layer are preferably the low refractive index layers. This is because coating property is improved when the top layer is the low refractive index layer and adhesion is improved when the bottom layer is the low refractive index layer.

Herein, whether an arbitrary refractive index layer of the infrared reflective layer is the high refractive index layer or the low refractive index layer is determined by the comparison of the refractive indexes between the adjacent refractive index layers. Specifically, when a certain refractive index layer is taken as the reference layer, it can be determined that the reference layer is the high refractive index layer (the adjacent layer is the low refractive index layer) in a case where the refractive index of the refractive index layer adjacent to the reference layer is lower than that of the reference layer. On the other hand, it can be determined that the reference layer is the low refractive index layer (the adjacent layer is the high refractive index layer) when the refractive index of the adjacent layer is higher than that of the reference layer. Consequently, whether a refractive index layer is the high refractive index layer or the low refractive index layer is a relative thing to be defined by the relation with the refractive index of the adjacent layer, and a certain refractive index layer can be both the high refractive index layer and the low refractive index layer by the relation with the adjacent layers.

Herein, there is a case in which a component constituting the high refractive index layer (hereinafter, also referred to as "high refractive index layer component") and a component constituting the low refractive index layer (hereinafter, also referred to as "low refractive index layer component") are mixed in the interface between two layers, and a layer comprising the high refractive index layer component and the low refractive index layer component (mixed layer) is formed. In this case, in the mixed layer, an assembly of the sites having the high refractive index layer component of 50% by mass or more is denoted as the high refractive index layer and an assembly of the sites having the low refractive index layer component of more than 50% by mass is denoted as the low refractive index layer. Specifically, for example, when the low refractive index layer and the high refractive index layer comprise respective different metal oxide particles, it is possible to determine whether the mixed layer which can be formed is the high refractive index layer or the low refractive index layer by the composition which is obtained by measuring the concentration profile of the metal oxide particles in the film thickness direction of these laminated films. The concentration profile of metal oxide particles in the laminated film can be observed by etching from the surface to the depth direction using a sputtering method, sputtering at a speed of 0.5 nm/min by taking the outermost surface as 0 nm using an XPS surface analyzer, and measuring an atomic composition ratio. In addition, even when a low refractive index component or a high refractive index component does not contain the metal oxide particles and is formed only of a water-soluble resin, in the same manner, each layer which is etched by sputtering can be regarded as the high refractive index layer or the low refractive index layer by a concentration profile of the water-soluble resin which is obtained by, for example, confirming the presence of a mixed region by measuring the carbon concentration in the film thickness direction, and then measuring the composition thereof with EDX.

The XPS surface analyzer is not particularly limited, and any model can be used, and ESCALAB-200R manufactured by VG Scientific is used. Measurement is performed using Mg for an X-ray anode at an output of 600 W (accelerating voltage 15 kV, emission current 40 mA).

It is preferable that an infrared shielding film is generally designed so as to have a great difference in refractive index between the low refractive index layer and the high refractive index layer from the viewpoint that an infrared reflectivity can be enhanced with a small number of layers. In the present embodiment, in at least one laminate (unit) constituted by the low refractive index layer and the high refractive index layer, the difference in refractive index between the low refractive index layer and the high refractive index layer which are adjacent to each other is preferably 0.1 or more, more preferably 0.3 or more, even more preferably 0.35 or more, and particularly preferably more than 0.4. In a case in which the infrared shielding film has a plurality of laminates (units) of the high refractive index layer and the low refractive index layer, the difference in refractive index between the high refractive index layer and the low refractive index layer in all of the laminates (units) is preferably within the above suitable range. However, even in this case, the refractive index layer constituting the top layer or the bottom layer of the infrared reflective layer may have a configuration to be out of the above suitable range.

The number of layers of the refractive index layer of the infrared reflective layer (units of the high refractive index layer and the low refractive index layer) is preferably 100 layers or less, that is, 50 units or less, more preferably 40 layers (20 units) or less, and even more preferably 20 layers (10 units) or less from the viewpoint described above.

[Refractive Index Layer: High Refractive Index Layer and Low Refractive Index Layer]

A refractive index layer is not particularly limited, and it is preferable to use a known refractive index layer used in the art. Examples of a known refractive index layer may include a refractive index layer formed by extrusion molding of a resin and a refractive index layer formed by using a wet film forming method.

(Refractive Index Layer Formed by Extrusion Molding of Resin)

As the method of forming the refractive index layer which is formed by extrusion molding of a resin, for example, it can be provided a method in which a molten resin obtained by melting a resin is extruded onto a casting drum from a multilayer extrusion die and then quenched. At this time, the resin sheet may be stretched after extruding and cooling of the molten resin. The draw ratio of a resin can be appropriately selected according to a resin and is preferably from 2 to 10 times in the vertical axis direction and the horizontal axis direction respectively.

The resin above is not particularly limited as long as it is a thermoplastic resin, and examples thereof may include a polyalkylene-based resin, a polyester-based resin, a polycarbonate-based resin, a (meth)acrylic-based resin, an amide-based resin, a silicone-based resin, a fluorine-based resin and so on.

Examples of the polyalkylene-based resin may include polyethylene (PE), polypropylene (PP) and so on.

Examples of the polyester-based resin may include a polyester resin comprising a dicarboxylic acid component and a diol component as a main constituent. At this time, examples of the dicarboxylic acid component may include terephthalic acid, isophthalic acid, phthalic acid, 2,6-naphthalene dicarboxylic acid, 2,7-naphthalene dicarboxylic acid, diphenyl sulfone dicarboxylic acid, diphenyl ether dicarboxylic acid, diphenyl ethane dicarboxylic acid, cyclohexane dicarboxylic acid, diphenyl dicarboxylic acid, diphenyl thioether dicarboxylic acid, diphenyl ketone dicarboxylic acid, phenylindane dicarboxylic acid and so on. In addition, examples of the diol component may preferably include ethylene glycol, propylene glycol, tetramethylene glycol, 1,4-butanediol, cyclohexanedimethanol, 2,2-bis(4-hydroxyphenyl)propane, 2,2-bis(4-hydroxyethoxyphenyl)propane, bis(4-hydroxyphenyl)sulfone, bisphenol fluorene dihydroxy ethyl ether, diethylene glycol, neopentyl glycol, hydroquinone, and cyclohexane diol. Among these, the polyester-based resin is preferably polyethylene terephthalate (PET), polybutylene terephthalate (PBT), poly(1,4-cyclohexanedimethylene terephthalate), polyethylene naphthalate (PEN) and so on.

Examples of the polycarbonate-based resin may include a reaction product of bisphenols such as bisphenol A and a derivative thereof with phosgene or phenyl dicarbonate.

Examples of the (meth)acrylic-based resin may include a homopolymer or copolymer such as acrylic acid, methacrylic acid, acrylonitrile, methacrylonitrile, methyl (meth) acrylate, ethyl (meth)acrylate, butyl (meth)acrylate, 2-ethylhexyl (meth) acrylate, cyclohexyl (meth) acrylate, benzyl (meth) acrylate, hydroxyethyl (meth) acrylate, 2-methoxyethyl (meth) acrylate, 2-ethoxyethyl (meth) acrylate, 2-butoxyethyl (meth) acrylate, (meth) acrylamide, N-methyl (meth)acrylamide, N-ethyl (meth) acrylamide, N,N-dimethyl (meth) acrylamide, N,N-diethyl (meth) acrylamide, N-isopropyl (meth)acrylamide, and N-tert-octyl (meth) acrylamide.

Examples of the amide-based resin may include an aliphatic amide-based resin such as 6,6-nylon 6-nylon, 11-nylon, 12-nylon, 4,6-nylon, 6,10-nylon, and 6,12-nylon; and an aromatic polyamide composed of an aromatic diamine such as phenylenediamine and an aromatic dicarboxylic acid such as terephthaloyl chloride or isophthaloyl chloride or a derivative thereof.

Examples of the silicone-based resin may include a resin comprising a siloxane bond having an organic group such as an alkyl group and an aromatic group as a constitutional unit. The alkyl group is not particularly limited and examples thereof may include a methyl group, an ethyl group, a propyl group, an isopropyl group, a butyl group, an isobutyl group, a sec-butyl group, a tert-butyl group, a pentyl group, a hexyl group and so on. In addition, the aromatic group is not particularly limited and examples thereof may include a phenyl group, a tolyl group, a xylyl group, a benzyl group and so on. Among these, it is preferable to have a methyl group and/or a phenyl group, and it is more preferable to have dimethylpolysiloxane, methylphenylpolysiloxane, diphenylpolysiloxane, and a modified product thereof.

Examples of the fluorine-based resin may include a homopolymer or copolymer such as tetrafluoroethylene, hexafluoropropylene, chlorotrifluoroethylene, vinylidene fluoride, vinyl fluoride, and perfluoroalkyl vinyl ether.

The resin described above may be used independently or as a mixture of two or more members thereof.

In the formation of the refractive index layer using an extrusion molding of a molten resin, examples of the preferred combination of materials of the high refractive index layer-low refractive index layer may include PEN-polymethyl methacrylate (PMMA), PET-PEN and so on.

(Refractive Index Layer Formed Using Wet Film Forming Method)

In the wet film forming method, the refractive index layer can be formed by a method to sequentially apply a coating liquid and to dry, a method to apply a coating liquid in a multilayer and to dry, and the like.

The refractive index layer formed in this manner usually comprises a water-soluble resin. In addition, metal oxide particles, a protective agent, a curing agent, and another additive may be further comprised therein, as needed.

(1) Water-Soluble Resin

The water-soluble resin is not particularly limited, and a polyvinyl alcohol-based resin, gelatin, celluloses, a polysaccharide thickener and a polymer having a reactive functional group can be used. Among these, the polyvinyl alcohol-based resin is preferably used. As used herein, the term "water-soluble" means a compound which is dissolved to be 1% by mass or more and preferably 3 mass % or more to a water medium.

Examples of a polyvinyl alcohol-based resin which is preferably used in the invention may include an ordinary polyvinyl alcohol (unmodified polyvinyl alcohol) obtained by hydrolysis of polyvinyl acetate, and also include a cation-modified polyvinyl alcohol having a cation-modified terminal, an anion-modified polyvinyl alcohol having an anionic group, a modified polyvinyl alcohol that is modified by acryl and the like, a reaction type polyvinyl alcohol (for example, "GOHSEFIMER Z" manufactured by The Nippon Synthetic Chemical Industry Co., Ltd.), and a vinyl acetate-based resin (for example, "EXCEVAL" manufactured by KURARAY CO., LTD.). These polyvinyl alcohol-based resins can also be concurrently used two or more members depending on polymerization degree, a difference in kind of modification and so on. In addition, it is also possible to concurrently use a silanol-modified polyvinyl alcohol having a silanol group (for example, "R-1130" manufactured by KURARAY CO., LTD).

The cation-modified polyvinyl alcohol is, for example, a polyvinyl alcohol having a first to tertiary amino group and a quaternary ammonium group in the main chain or a side chain of the above polyvinyl alcohol as described in JP S61-10483 A and can be obtained by saponifying a copolymer of an ethylenically unsaturated monomer having a cationic group and vinyl acetate.

Examples of the anion-modified polyvinyl alcohol may include a polyvinyl alcohol having an anionic group as described in JP H1-206088 A, a copolymer of vinyl alcohol and a vinyl compound having a water-soluble group as described in JP S61-237681 A and JP S63-307979 A, and a modified polyvinyl alcohol having a water-soluble group as described in JP H7-285265 A.

In addition, examples of the nonionically modified polyvinyl alcohol may include a polyvinyl alcohol derivative obtained by adding a polyalkylene oxide group to a part of vinyl alcohol as described in JP H7-9758 A and a block copolymer of a vinyl compound having a hydrophobic group and vinyl alcohol as described in JP H8-25795 A. Polyvinyl alcohol can also be concurrently used two or more members depending on polymerization degree, a difference in kind of modification and so on.

In addition, examples of the vinyl acetate-based resin may include EXCEVAL (trade name: manufactured by KURARAY CO., LTD.), Nichigo G-polymer (trade name: manufactured by The Nippon Synthetic Chemical Industry Co., Ltd.) and so on.

The polymerization degree of the above polyvinyl alcohol resin is preferably from 1500 to 7000 and more preferably from 2000 to 5000. It is preferable that the polymerization degree is 1500 or more since crack resistance of the coating film at the time of forming the refractive index layer is improved. On the other hand, it is preferable that the polymerization degree is 7000 or less since a coating liquid at the time of forming the refractive index layer is stable. As used herein, the term "polymerization degree" indicates a viscosity average polymerization degree, and a value measured according to JIS-K6726 (1994) is adopted. Specifically, it can be calculated by the following formula from the intrinsic viscosity [η] (dl/g) measured in water at 30° C. after purifying the polyvinyl alcohol-based resin by the complete re-saponification.

$$P=([\eta]\times10^3/8.29)^{(1/0.62)} \quad \text{[Math. 1]}$$

Note that, in the above formula, P represents a polymerization degree and η represents an intrinsic viscosity.

It is preferable that a high refractive index layer and a low refractive index layer constituting an infrared reflective layer respectively comprise polyvinyl alcohol-based resins having different saponification degrees from each other. Consequently, it is preferable that a mixing at an interface is suppressed, an infrared reflectivity (infrared shield factor) becomes better, and there is a low haze. At this time, either of the high reflective index layer or the low reflective layer may have a higher value of a degree of saponification of a polyvinyl alcohol-based resin than the other; however, a degree of saponification of a polyvinyl alcohol-based resin comprised in the high reflective index layer is preferably higher than the other. The polyvinyl alcohol-based resin having a high degree of saponification can protect metal oxide particles in a case in which the metal oxide particles are comprised in the high refractive index layer. A difference in the absolute value of a degree of saponification of the polyvinyl alcohol-based resins comprised in the high refractive index layer and the low refractive index layer is preferably 3 mol % or more and more preferably 5 mol % or more. It is preferable that the difference in the absolute value of the degree of saponification is 3 mol % or more since the interlayer mixing state of the high refractive index layer and the low refractive index layer is set to a preferred level. Meanwhile, it is preferable that the difference in the absolute value of the degree of saponification is as large as possible; however, the difference in the absolute value of the degree of saponification is preferably 20 mol % or less from the viewpoint of solubility of polyvinyl alcohol in water.

The degree of saponification of the polyvinyl alcohol-based resin comprised in the high refractive index layer and the low refractive index layer is preferably 75 mol % or more from the viewpoint of solubility in water. In addition, with regard to the degree of saponification of the polyvinyl alcohol-based resin comprised in the high refractive index layer and the low refractive index layer, it is preferable that saponification of one refractive index layer is 90 mol % or more and the degree of saponification of the other refractive index layer is 90 mol % or less; it is more preferable that saponification of one refractive index layer is 90 mol % or less and the degree of saponification of the other refractive index layer is 95 mol % or more. In particular, it is more preferable that the degree of saponification of the polyvinyl alcohol-based resin comprised in the low refractive index layer is 90 mol % or less and the degree of saponification of the polyvinyl alcohol-based resin comprised in the high refractive index layer is 95 mol % or more. It is preferable that, when the degree of saponification of the polyvinyl alcohol-based resins comprised in the high refractive index layer and the low refractive index layer has a relationship mentioned above, the interlayer mixing state of the high refractive index layer and the low refractive index layer can be set to a preferred level. Meanwhile, the upper limit of the degree of saponification of the polyvinyl alcohol-based resin is not particularly limited and is usually less than 100 mol %; preferably 99.9 mol % or less.

In the invention, the content of a polyvinyl alcohol-based resin (total polyvinyl alcohol-based resin) is preferably from 5 to 50% by mass, more preferably from 10 to 40% by mass, and even more preferably from 14 to 30% by mass based on 100% by mass of the total mass (solid matter) of each refractive index layer. It is preferable that the content of the polyvinyl alcohol-based resin is 5% by mass or more since the film surface becomes uniform at the time of drying the coating film formed during the formation of the refractive index layer and thus transparency can be improved. On the other hand, it is preferable that the content of the polyvinyl alcohol-based resin is 50% by mass or less since in a case where metal oxide particles are comprised in a refractive layer, the content becomes appropriate and thus it is possible to increase the refractive index difference between the high refractive index layer and the low refractive index layer. Meanwhile, as used herein, the term "film surface" (also referred to as "surface") means the surface of the coating film obtained at the time of forming the refractive index layer. In addition, the term "total polyvinyl alcohol-based resin" means the total amount of the polyvinyl alcohol-based resin comprised in each of the refractive index layers.

Gelatin

Examples of usable gelatin may conventionally include various members of gelatin which have been widely used in the field of silver halide photographic sensitive material. In more detail, acid-treated gelatin, alkali-treated gelatin, enzyme-treated gelatin, and a derivative thereof may be exemplified.

Celluloses

Usable celluloses are not particularly limited, and a water-soluble cellulose derivative can be preferably used. Examples of the water-soluble cellulose derivative may include a water-soluble cellulose derivative such as carboxymethyl cellulose (cellulose carboxymethyl ether), methyl cellulose, hydroxymethyl cellulose, hydroxyethyl cellulose, and hydroxypropyl cellulose; carboxymethyl cellulose (cellulose carboxymethyl ether) and carboxyethyl cellulose which are carboxylic acid group-containing cellulose.

Polysaccharide Thickener

A usable polysaccharide thickener is not particularly limited, and examples thereof may include a generally known natural simple polysaccharide, natural complex polysaccharide, synthetic simple polysaccharide, and synthetic complex polysaccharide. Specifically, the examples may include pectin, galactan (for example, agarose and agaropectin), galactomannoglycan (for example, locust bean gum and guaran), xyloglucan (for example, tamarind gum and tamarind seed gum), glucomannoglycan (for example, konjac mannan, wood-derived glucomannan, and xanthan gum), galactoglucomannoglycan (for example, coniferous wood-derived glycan), arabinogalactoglycan (for example, soybean-derived glycan and microorganism-derived glycan), glucorhamnoglycan (for example, gellan gum), glycosaminoglycan (for example, hyaluronic acid and keratan sulfate), alginic acid and alginate, and a natural polymer polysaccharide derived from red algae such as agar, κ-carrageenan, λ-carrageenan, ιL-carrageenan, and furcellaran.

Polymer Having Reactive Functional Group

Examples of a usable polymer having a reactive functional group may include polyvinylpyrrolidones; an acrylic resin such as polyacrylic acid, acrylic acid-acrylonitrile copolymer, potassium acrylate-acrylonitrile copolymer, vinyl acetate-acrylic ester copolymer, and acrylic acid-acrylic ester copolymer; a styrene acrylic acid resin such as styrene-acrylic acid copolymer, styrene-methacrylic acid copolymer, styrene-methacrylic acid-acrylic acid ester copolymer, styrene-α-methylstyrene-acrylic acid copolymer, and styrene-α-methylstyrene-acrylic acid-acrylic acid ester copolymer; a styrene-sodium styrene sulfonate copolymer; a styrene-2-hydroxyethyl acrylate copolymer; a styrene-2-hydroxyethyl acrylate-potassium styrene sulfonate copolymer; a styrene-maleic acid copolymer; a styrene-maleic anhydride copolymer; a vinyl naphthalene-acrylic acid copolymer; a vinyl naphthalene-maleic acid copolymer; and a vinyl acetate-based copolymer such as vinyl acetate-maleic acid ester copolymer, vinyl acetate-crotonic acid copolymer, and vinyl acetate-acrylic acid copolymer and a salt thereof.

The water-soluble resins described above may be used independently or as a mixture of two or more members thereof.

(2) Metal Oxide Particles

Metal oxide particles are an optional constituent which can be comprised in a refractive index layer. It is possible to increase the refractive index difference between the low refractive index layer and the high refractive index layer by comprising metal oxide particles.

As described above, whether a high refractive index layer or a low refractive index layer is a relative thing determined by the relationship to an adjacent refractive index layer; however, representative metal oxide particles comprised in a low refractive index layer as "first metal oxide particles" and representative metal oxide particles comprised in a high refractive index layer as "second metal oxide particles" are respectively described below.

First Metal Oxide Particles

The first metal oxide particles are not particularly limited, and examples thereof may include zinc oxide; silicon dioxide such as synthetic amorphous silica and colloidal silica; alumina; and colloidal alumina. Among these, it is preferable to use silicon dioxide, and it is particularly preferable to use colloidal silica. Meanwhile, the above first metal oxides may be used independently or as a mixture of two or more members thereof.

The colloidal silica is obtained by heat-aging the silica sol obtained by double-decomposing with an acid such as sodium silicate or by passing through an ion exchange resin layer.

A synthetic product may be used as such colloidal silica, and a commercial product may also be used. Examples of a commercial product may include SNOWTEX series (SNOWTEX OS, OXS, S, OS, 20, 30, 40, O, N, and C manufactured by NISSAN CHEMICAL INDUSTRIES, LTD.).

The colloidal silica may be cation-modified on the surface and also treated with Al, Ca, Mg, Ba and so on.

The average particle size of the first metal oxide particles (preferably silicon dioxide) is preferably from 3 to 100 nm and more preferably from 3 to 50 nm. Meanwhile, as used herein, the "average particle size (number average)" of the metal oxide particles shall adopt the value obtained as a simple average, which particles themselves or any 1000 particles appeared on a cross section and surface of a refractive index layer are observed with an electron microscope and measured a particle size. At this time, the particle size of the particles is represented by the diameter when assuming a circle equal to a projected area of a particle.

The content of the first metal oxide particles in a low refractive index layer is preferably from 20 to 75% by mass, more preferably from 30 to 70% by mass, even more preferably from 35 to 69% by mass, and particularly preferably from 40 to 68% by mass based on 100% by mass of the total solid content of the low refractive index layer. It is preferable that the content of the first metal oxide particles be 20% by mass or more since the desired refractive index can be obtained. On the other hand, it is preferable that the content of the first metal oxide particles be 75% by mass or less since the coating property of the coating liquid that can be used when forming the low refractive index layer can be favorable.

Second Metal Oxide Particles

The second metal oxide particles are not particularly limited, and are preferably different from the first metal oxide particles. Specific examples thereof may include titanium oxide, zirconium oxide, zinc oxide, alumina, colloidal alumina, niobium oxide, europium oxide and so on. Among these, in terms of forming a high refractive index layer having transparency and higher refractive index, it is preferable to use titanium oxide and zirconium oxide and it is more preferable to comprise a rutile type (tetragonal system) titanium oxide particle. Meanwhile, the second metal oxides may be used independently or as a mixture of two or more members thereof.

Titanium oxide described above is preferably used by modifying the surface of titanium oxide sol and being a dispersible state in water, an organic solvent or the like. It is possible, for example as a preparation method of the water-based titanium oxide sol, to refer to the matters described in JP S63-17221 A, JP H7-819 A, JP H9-165218 A, JP H11-43327 A, and JP S63-17221 A.

In a case in which titanium oxide particles are used as the second metal oxide particles, it is possible, for example as another manufacturing method of titanium oxide particles, to refer to the method described in SEKINO Manabu, "titanium oxide: physical properties and application technology" p. 255 to 258 (2000) GIHODO SHUPPAN Co., Ltd. or paragraphs from [0011] to [0023] in WO 2007/039953 A. The manufacturing method according to the above process (2) comprises; process (1) where titanium oxide hydrate is treated with at least one basic compound selected from a group consisting of alkali metal hydroxides and alkaline earth metal hydroxides and then process (2) where the obtained titanium oxide dispersion is treated with a carboxylic acid group-containing compound and an inorganic acid.

In addition, the titanium oxide particles may be in the form of core-shell particles covered with a silicon-containing hydrous oxide. The core-shell particles have a structure where the surface of titanium oxide particles is coated with a shell having titanium oxide as a core with silicon-containing hydrous oxide. The volume average particle size of the titanium oxide particles as the core at this time is preferably more than 1 nm and less than 30 nm; more preferably 4 nm or more and less than 30 nm. Such core-shell particles are comprised; therefore, the interlayer mixing of a high refractive index layer and a low refractive index layer can be suppressed by the interaction of the silicon-containing hydrous oxide of the shell layer with the water-soluble resin.

The silicon-containing hydrous oxide may be any one of a hydrate of an inorganic silicon compound, a hydrolysate and/or condensate of an organic silicon compound and preferably these have a silanol group. Consequently, the core-shell particles are preferably silica-modified (silanol-modified) titanium oxide particles in which the titanium oxide particles are silica-modified.

The coating amount of a silicon-containing hydrous compound of titanium oxide is preferably from 3 to 30% by mass, more preferably from 3 to 10% by mass, and even more preferably from 3 to 8% by mass based on 100% by mass of titanium oxide. It is preferable that the covering amount is 3% or more since the core-shell particles can be stably formed. On the other hand, it is preferable that the covering amount is 30 mass % or less since the high refractive index layer has the desired refractive index value.

The average particle size (number average) of the second metal oxide particles is preferably from 3 to 100 nm and more preferably from 3 to 50 nm.

In addition, the volume average particle size of the second metal oxide particles is preferably 50 nm or less, more preferably from 1 to 45 nm, and even more preferably from 5 to 40 nm. It is preferable that the volume average particle size is 50 nm or less since the haze is low and visible light transmittivity is excellent. As used herein, the term "volume average particle size" means the volume average particle size of the primary particles or secondary particles dispersed in a medium. The volume average particle size shall adopt the value measured by the following method.

Specifically, any 1000 particles appeared on a cross section and surface of a refractive index layer are observed; the particle sizes thereof are measured, and then the volume average particle size is calculated by the following formula when the volume per one particle is set to vi in a group of metal oxide particles where a particle having a particle size of d1, d2 . . . di . . . dk are present n1, n2 . . . ni . . . nk particle(s), respectively.

$$mv=\{\Sigma(vi \cdot di)\}/\{\Sigma(vi)\} \quad [\text{Math. 2}]$$

The content of the second metal oxide particles is preferably from 15 to 85% by mass, more preferably from 20 to 80% by mass, and even more preferably from 30 to 75% by mass based on 100% by mass of the total solid matter of a high refractive index layer. It is possible to be excellent infrared shielding properties by being within the above rage.

The first metal oxide particles and the second metal oxide particles are preferably monodispersity. As used herein, the "monodispersity" is monodispersity of 40% or less obtained by the following formula; more preferably 30% or less; and particularly preferably from 0.1 to 20%.

$$\text{Degree of monodispersity}=(\text{standard deviation of particle size})/(\text{average value of particle size}) \times 100. \quad [\text{Math. 3}]$$

The first metal oxide particles and the second metal oxide particles are preferably made a state of same ionicity (that is, same charge sign). For example, in a case in which a simultaneous multilayer coating is performed upon forming a refractive index layer, the same ionicity prevents formation of an aggregate on the interface and thus excellent haze can be obtained. Examples of means for being the same ionicity may comprise a method in which silicon dioxide is treated with aluminum or the like so as to be cationized or a method in which titanium oxide is treated with a silicon-containing hydrous oxide so as to be anionized as described above in the case of using silicon dioxide (anion) in a low refractive index layer and titanium oxide (cation) in a high refractive index layer.

(3) Protective Agent

In one embodiment of the invention, it is preferable that a refractive index layer comprises a water-soluble resin to coat (protect) the metal oxide particles. Hereinafter, the water-soluble resin to coat (protect) the metal oxide particles (hereinafter, also referred to as the "protective agent") is described. The protective agent has a function to allow easy dispersion of metal oxide particles in a solvent.

As the protective agent, a polyvinyl alcohol-based resin is preferable from the viewpoint of absorptivity, and a modified polyvinyl alcohol is even more preferable from the viewpoint of transparency and stabilization. At this time, a polymerization degree of the protective agent is preferably from 100 to 700 and more preferably from 200 to 500. It is preferable that the polymerization degree is in the above range since the metal oxide particles can be stabilized. In addition, in the case of using polyvinyl alcohol as the protective agent, a saponification degree thereof is preferably 95 mol % or more and more preferably from 98 to 99.5 mol % from the viewpoint of absorptivity to the metal oxide particles.

In the invention, the content of the protective agent in the refractive index layer is preferably from 0.1 to 30% by mass, more preferably from 0.5 to 20% by mass, and even more preferably from 1 to 10% by mass based on 100% by mass of the metal oxide particles. It is preferable that the content of the protective agent is within the above range since the liquid stability of the coating liquid which can be used at the time of forming the refractive index layer is excellent and thus the coating property is stabilized.

(4) Curing Agent

The refractive index layer may further comprise a curing agent. The curing agent can react with the water-soluble resin (preferably, polyvinyl alcohol-based resin) comprised in the refractive index layer and thus can form a network of a hydrogen.

The curing agent which can be used together with the polyvinyl alcohol-based resin is not particularly limited as long as it causes a curing reaction with the polyvinyl alcohol-based resin, and examples thereof may include boric acid, a borate salt, and borax.

Boric acid or a borate salt refers to an oxygen acid having a boron atom as the central atom and a salt thereof, and specific examples thereof may include orthoboric acid, diboric acid, metaboric acid, tetraboric acid, pentaboric acid, octaboric acid, and a salt thereof. In addition, borax is a mineral represented by $Na_2B_4O_5(OH)_4 \cdot 8H_2O$ (sodium tetraborate ($Na_2B_4O_7$) decahydrate).

Boric acid, a borate salt, and borax can be usually used by adding to the coating liquid which can be used at the time of forming the refractive index layer in the form of an aqueous solution.

In addition, a known curing agent other than the above curing agents can be used. Examples thereof may include a compound which has a functional group capable of reacting with a polyvinyl alcohol-based resin and a compound which promotes the reaction of functional groups of a polyvinyl alcohol-based resin. Specific examples thereof may include an epoxy-based curing agent such as diglycidyl ethyl ether, ethylene glycol diglycidyl ether, 1,4-butanediol diglycidyl ether, 1,6-diglycidyl cyclohexane, N,N-diglycidyl-4-glycidyloxy aniline, sorbitol polyglycidyl ether, and glycerol polyglycidyl ether; an aldehyde-based curing agent such as formaldehyde and glyoxal; an active halogen-based curing agent such as 2,4-dichloro-4-hydroxy-1,3,5-s-triazine; an active vinyl-based compound such as 1,3,5-tris acryloylhexahydro-s-triazine and bisvinylsulfonyl methyl ether; aluminum alum, a titanium-based cross-linking agent (such as TC-300 manufactured by Matsumoto Fine Chemical Co., Ltd.), and a zirconium-based cross-linking agent (such as Zircosol AC-20 and Zircosol ZA-30 manufactured by DAIICHI KIGENSO KAGAKU KOGYO CO., LTD.).

Among the curing agents described above, it is preferable to use boric acid and its salts and/or borax in the invention. The metal oxide particles and a hydroxyl group of a polyvinyl alcohol-based resin can form a hydrogen bond network in the case of using boric acid and its salts and/or borax. As a result, the interlayer mixing of a high refractive index layer and a low refractive index layer is suppressed, and the preferred infrared shielding property can be achieved. In particular, the above effect can be more preferably exhibited in a case where a multi-layered layer of a high refractive index layer and a low refractive index layer is formed by coating with a coater, the film surface temperature of the coating film is once cooled to about 15° C., and then the film surface is dried; so-called setting coating process.

The content of the above curing agents is preferably from 1 to 600 mg and more preferably from 100 to 600 mg per 1 g of a water-soluble resin (preferably, polyvinyl alcohol resin).

(5) Other Additives

The refractive index layer may further comprise various members of additives if required.

Examples thereof may include a fluorescent whitening agent; a pH adjusting agent such as sulfuric acid, phosphoric acid, acetic acid, citric acid, sodium hydroxide, potassium hydroxide, and potassium carbonate; an antifoaming agent; a lubricant such as diethylene glycol; a preservative; an antistatic agent; and a matting agent.

Among the refractive index layers described above, the refractive index layer is preferably a refractive index layer formed by a wet film forming method, more preferably a refractive index layer comprising a water-soluble resin from the viewpoint of suitably exhibiting an effect of the invention, and even more preferably a refractive index layer comprising a water-soluble resin and metal oxide particles (the first metal oxide particles and the second metal oxide particles) from the viewpoint of forming a suitable infrared reflective layer.

As described above, whether a refractive index layer is a high refractive index layer or a low refractive index layer is a relative thing to be defined by the relation with the adjacent refractive index layer; however, a refractive index (nL) of the low refractive index layer is preferably from 1.10 to 1.60 and more preferably from 1.30 to 1.50. On the other hand, refractive index (nH) of the high refractive index layer is preferably from 1.80 to 2.50 and more preferably from 1.90 to 2.20. Here, the value of the refractive index of each refractive index layer adopts the value measured in the following manner. Specifically, a refractive index layer to be measured is coated in a single layer on a support, the obtained coating film is cut into 10 cm×10 cm, and a sample is formed. The sample is performed a surface roughening treatment which is applied to the opposite side surface (back surface) to the measuring surface, and a light absorption treatment which is performed by using a black spray in order to protect the reflection of light on the back surface. The reflectivity of the above manufactured sample in the visible region (400 nm to 700 nm) is measured at 25 points under a condition of 5° specular reflection using a spectrophotometer U-4000 Model (manufactured by Hitachi, Ltd.) so as to determine an average value, and the average refractive index is determined from the measurement result.

The reflectivity in a specific wavelength region is determined by the refractive index difference between two adjacent layers and the number of laminated layers, and the same reflectivity is obtained by a smaller number of layers as the difference in refractive index is greater. This refractive index difference and the required number of layers can be calculated by using a commercially available optical design software. It is required, for example, to laminate 200 or more layers in order to obtain an infrared reflectivity of 90% or more when the refractive index difference is less than 0.1. In such a case, a decrease in productivity, an increase in scattering at the interface between the laminated layers, deterioration in transparency, and a trouble at the time of manufacture can occur. There is no upper limit on the refractive index difference from the viewpoint of the improvement in reflectivity and a decrease in the number of layers.

The thickness per one layer of the low refractive index layer constituting the infrared reflective layer is preferably from 20 to 800 nm and more preferably from 50 to 350 nm. On the other hand, the thickness per one layer of the high refractive index layer is preferably from 20 to 800 nm and more preferably from 50 to 350 nm.

The infrared reflective layer may be provided on only one surface of the substrate or both surfaces thereof; however, it is preferably provided on both surfaces of the substrate. As described above, in the infrared reflective layer, the number of the laminated layers in the refractive index layer may increase in some cases. There is a case in which a curl is formed on the infrared reflective layer when such a great number of laminated layers are provided on one surface. However, the curl balance is improved by providing the infrared reflective layers on both surfaces of the substrate, and as a result, curling can be suppressed. Moreover, in such a form, the invention can be suitably applied since the infrared reflective layer is inevitably required to be provided with a hard coat layer in the case of being bonded to the window or the like. In other words, one preferred form of this embodiment is an infrared shielding film in which the infrared reflective layer-substrate-infrared reflective layer-resin adhesive layer-hard coat layer are arranged in this order.

<Resin Adhesive Layer>

A resin adhesive layer has a function to enhance the adhesive property between an infrared reflective layer and a hard coat layer. The resin adhesive layer comprises at least one member selected from the group consisting of polyvinyl acetal resins, acrylic resins, and urethane resins. The thickness of the resin adhesive layer is preferably from 0.3 to 3 μm and more preferably from 0.5 to 2 μm.

[Polyvinyl Acetal Resin]

A polyvinyl acetal resin is a resin acetalized by reacting at least one of hydroxyl groups of polyvinyl alcohol with an aldehyde. Specific examples of the polyvinyl acetal resin may include polyvinyl alcohol such as polyvinyl formal and polyvinyl butyral; partially formalized polyvinyl alcohol such as partially formalized polyvinyl butyral; and copolymer acetal such as polyvinyl butyral acetal. These polyvinyl acetal resins may comprise another repeating unit.

These polyvinyl acetal resins can be prepared personally, or may use a commercially available product. A known technique is used in the case of being prepared personally. Examples of the known technique may include a method in which a polyvinyl alcohol is allowed to react with an aldehyde in the presence of an acid catalyst such as hydrochloric acid or sulfuric acid. In addition, examples of the commercially available product may include Denka butyral #2000L, #3000-1, #3000-K, #4000-1, #5000-A, and #6000-C, and Denka formal #20, #100, and #200 (manufactured by DENKI KAGAKU KOGYO KABUSHIKI KAISHA), and S-LEC B Series BL-1, BL-2, BL-S, BM-1, BM-2, BH-1, BX-1, BX-10, BL-1, BL-SH, and BX-L, S-LEC K series KS-10, S-LEC KW Series KW-1, KW-3, and KW-10, and S-LEC KX Series KX-1 and KX-5 (manufactured by SEKISUI CHEMICAL CO., LTD.).

The acetalization ratio of the polyvinyl acetal resin is preferably from 5 to 65 mol %, and is more preferably from 15 to 50 mol % from the viewpoint of the solubility in water and the effect of adhesive property. It is preferable that the acetalization ratio is 5 mol % or more, since the adhesive property to the hard coat layer can be improved. On the other hand, it is preferable that the acetalization ratio is 65 mol % or less since the effect of adhesive property on the infrared reflective layer can be improved. Meanwhile, the average value of the acetalization ratio calculated in consideration of the amount to be mixed is adopted in a case in which a polyvinyl acetal resins is mixed. For example, in a case in which 65 mol % of a polyvinyl acetal resin and 5 mol % of it are mixed with equal amount, the acetalization ratio is (65×50/100)+(5×50/100)=35 mol %. The acetalization ratio can be controlled by appropriately adjusting polyvinyl alcohol, aldehyde, a member of catalyst or the like, an additive amount, a reaction temperature and the like. In general, the higher the value of the acetalization ratio, there is a tendency to dissolve in water.

[Acrylic Resin]

An acrylic resin is a resin being an acrylic monomer as a constituent component of the polymer. The acrylic monomer is not particularly limited, and examples thereof may include acrylic acid, methacrylic acid, acrylamide, methacrylamide, an acrylic ester, a methacrylic ester, an amino group-substituted alkyl acrylate, an amino group-substituted alkyl methacrylate, an epoxy group-containing acrylate, a substituted acrylamide, a substituted methacrylamide, an acrylate, and a methacrylate.

Examples of the acrylic ester may include an alkyl acrylate such as methyl acrylate, ethyl acrylate, n-propyl acrylate, isopropyl acrylate, n-butyl acrylate, isobutyl acrylate, t-butyl acrylate, 2-ethylhexyl acrylate, cyclohexyl acrylate, phenyl acrylate, benzyl acrylate, and phenylethyl acrylate; and a hydroxy-containing alkyl acrylate such as 2-hydroxyethyl acrylate and 2-hydroxypropyl acrylate.

Examples of the methacrylic ester may include an alkyl methacrylate such as methyl methacrylate, ethyl methacrylate, n-propyl methacrylate, isopropyl methacrylate, n-butyl methacrylate, isobutyl methacrylate, t-butyl methacrylate, 2-ethylhexyl methacrylate, cyclohexyl methacrylate, phenyl methacrylate, benzyl methacrylate, and phenylethyl methacrylate; and a hydroxy-containing alkyl methacrylate such as 2-hydroxyethyl methacrylate and 2-hydroxypropyl methacrylate.

The acrylic monomers described above may be used independently or as a mixture of two or more members thereof.

As the acrylic resin of the invention, it is preferable to use water-based one from the viewpoint of coating property, it is preferable to use an aqueous acrylic solution or an acrylic emulsion, and it is more preferable to use an aqueous acrylic solution from the viewpoint of transparency. In the case of the aqueous acrylic solution, it is preferable that the acrylic resin is modified from the viewpoint of water solubility. In addition, a variety of the acrylic emulsion is commercially available, and the Tg thereof is preferably 20° C. or lower from the viewpoint of film formability and the particle size thereof is preferably 100 nm or less from the viewpoint of transparency.

[Urethane Resin]

A urethane resin is a resin formed via a urethane bond. As the urethane resin, it is preferable to use a hydrophilic polyurethane resin having a sulfonate alkali base or a carboxylate amine base. Examples of the hydrophilic polyurethane resin may include polyethylene glycol-diphenylmethane diisocyanate-ethylenediamine, dimethylol propionate amine salt-type polyurethane.

As the urethane resin of the invention, it is preferable to use water-type one from the viewpoint of coating property, and it is preferable to use a urethane emulsion. A variety of the urethane emulsion is commercially available, and the Tg thereof is preferably 20° C. or lower from the viewpoint of film formability and the particle size thereof is preferably 100 nm or less from the viewpoint of transparency.

The polyvinyl acetal resins, acrylic resins, and urethane resins described above may be used independently or as a mixture of two or more members thereof.

In a case in which a resin adhesive layer comprises at least one member selected from the group consisting of the above polyvinyl acetal resins, acrylic resins, and urethane resins, adhesive property to the infrared reflective layer described above and the hard coat layer described below is improved. The reason for the improvement of adhesion is not clear; however, it is presumed that the adhesive property is improved by the following mechanism.

With regard to the relation with the infrared reflective layer, it is considered that the hydrophilic group in the resin constituting the resin adhesive layer contributes to the improvement in adhesion. Specifically, the hydrophilic group interacts with a hydrophilic group in a component (for example, water-soluble resin) of the refractive index layer constituting the infrared reflective layer due to a hydrogen bond, a covalent bond, a coordinate bond, and the like, and this is considered to contribute to the improvement in adhesion to the infrared reflective layer. Such a mechanism is also supported by the fact that the improvement in adhesion to the infrared reflective layer and the hard coat layer is hardly obtained when a resin which does not comprise a hydrophilic group is used in the resin adhesive layer. Here, the hydrophilic group is not particularly limited, and examples thereof may include a hydroxyl group, an amino group, a carboxyl group, a carbonyl group, a thio group, a sulfo group, and a phosphate group.

On the other hand, it is considered that hydrophobicity in the resin constituting the above resin adhesive layer contributes to the relation with the hard coat layer. Specifically, the hard coat layer has high hydrophobicity as described below, a resin adhesive layer is formed on a resin having hydrophobicity, and then there is elution into at least a part of resin in the hard coat layer and there is a molecular interaction such as strong van der Waals force; therefore, this is considered to contribute to the improvement in adhesion to the hard coat layer. Such a mechanism is also supported by the fact that the improvement in adhesion to the infrared reflective layer and the hard coat layer is hardly obtained when a non-modified polyvinyl alcohol which does not comprise a hydrophobic group is used in the resin adhesive layer.

Consequently, it is considered that the resin described above satisfies the balance between hydrophilicity and hydrophobicity, and thus it is possible to improve adhesion of the infrared reflective layer and the hard coat layer. However, the mechanism described above is only a presumption, and thus the improvement in adhesion described above is included in the technical idea of the invention even if obtained by a different mechanism.

[Metal Oxide Particles]

The resin adhesive layer may further comprise metal oxide particles if required.

Usable metal oxide particles are not particularly limited, and the first metal oxide particles and second metal oxide particles described above can be used. Among these, it is preferable to use silicon dioxide and alumina from the viewpoint of adhesion and transparency.

The particle size of the metal oxide particles comprised in the resin adhesive layer is preferably 100 nm or less and more preferably from 3 to 30 nm. It is preferable that the particle size is 100 nm or less, since transparency is excellent.

The content of the metal oxide particles in the resin adhesive layer is preferably from 3 to 30% by mass and more preferably from 5 to 25% by mass based on 100% by mass of the total solid matter of the resin adhesive layer.

The resin adhesive layer has a hydrophilic group, and thus there may be elution in the infrared reflective layer in the manufacturing process, the storage environment, and the like in some cases. As a result, there is a possibility to affect the infrared reflectivity. The elution can be suppressed by comprising the metal oxide particles in the resin adhesive layer. In addition, swelling of the resin can be suppressed and durability may enhance by comprising the metal oxide particles in the resin adhesive layer. Particularly, high durability is required to the infrared shielding film to be exposed to a severe environment such as the inside of a car during the daytime, and thus the improvement in durability obtained by comprising the metal oxide particles in the resin adhesive layer is significantly effective.

[Zirconium Compound]

The resin adhesive layer may further comprise a zirconium compound if required. Adhesion can be improved by comprising a zirconium compound.

A usable zirconium compound is not particularly limited, and is preferably water-type one. Specific examples of the zirconium compound may include zirconium oxychloride $ZrOCl_2$, $ZrO(OH)Cl$, zirconium oxynitrate $ZrO(NO_3)_2$, ammonium zirconium carbonate: $(NH_4)_2Zr(OH)_2(CO_3)_2$, zirconium acetate $ZrO(C_2H_3O_2)_2$. The zirconium compound to be used may be a commercially available product. Examples of a commercially available product may include Zircosol ZC-20, Zircosol ZC-2, Zircosol ZN, Zircosol AC-7, and Zircosol ZA-30 (manufactured by DAIICHI KIGENSO KAGAKU KOGYO CO., LTD.), ORGATIX ZB-216 (manufactured by Matsumoto Fine Chemical Co., Ltd.), AZ-COTE 5800MT (manufactured by SAN NOPCO LIMITED), and BAYCOURT 20 (manufactured by Nippon Light Metal Co., Ltd.). Among these, it is preferable to be pH of 5 or more. The pH can also be adjusted with an acid or an alkali.

[Heat Ray-Absorbing Particles]

The resin adhesive layer preferably further comprises heat ray-absorbing particles.

The heat ray-absorbing particles are preferably metal oxide particles, and examples thereof may include tin oxide, zinc oxide, titanium oxide, tungsten oxide, and indium oxide. Specific examples of the particles may include aluminum-doped tin oxide particles, indium-doped tin oxide particles, antimony-doped tin oxide (ATO) particles, gallium-doped zinc oxide (GZO) particles, indium-doped zinc oxide (IZO) particles, aluminum-doped zinc oxide (AZO) particles, niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide (ITO) particles, tin-doped zinc oxide particles, and silicon-doped zinc oxide particles.

The heat ray-absorbing particles is preferably at least one member selected from the group consisting of tin-doped indium oxide particles (ITO), antimony-doped tin oxide particles (ATO), and aluminum-doped zinc oxide particles (AZO) and more preferably aluminum-doped zinc oxide particles from the viewpoint of further enhancing the infrared shielding property.

The volume average particle size of the above heat ray-absorbing particles is not particularly limited, and it is preferably from 1 to 50 nm, more preferably from 2 to 40 nm, and particularly preferably from 3 to 30 nm.

[Other Additives]

In addition, the resin adhesive layer may comprise various members of additives.

The additives are not particularly limited, and examples thereof may include an ultraviolet absorber, an antifading agent, a fluorescent whitening agent, a pH adjusting agent, an antifoaming agent, a lubricant, a preservative, an antistatic agent, and a matting agent.

<Hard Coat Layer>

The hard coat layer has a function to prevent the infrared shielding film from being scratched. The hard coat layer comprises a hard coat agent. It may further comprise other additives if required.

[Hard Coat Agent]

An active energy ray-curable resin is used as the hard coat agent. In addition, a thermosetting resin or the like may be used together with the active energy ray-curable resin if required. As described herein, the term "active energy ray" represents active rays such as ultraviolet rays and electron beams; it preferably means ultraviolet rays.

The active energy ray-curable resin is not particularly limited, and it is preferable to comprise a monomer having an ethylenically unsaturated double bond and it is more preferably an ultraviolet curable resin. The ultraviolet curable resin is not particularly limited, and examples thereof may include an ultraviolet curable urethane (meth)acrylate resin, an ultraviolet curable polyester (meth)acrylate resin, an ultraviolet curable epoxy (meth)acrylate resin, and an ultraviolet curable polyol (meth)acrylate resin. Among these, it is preferable to use an ultraviolet curable (meth) acrylate resin.

The ultraviolet curable urethane (meth)acrylate resin can be easily obtained; a product is obtained by reacting a polyester polyol with an isocyanate monomer or prepolymer; furthermore, the product is allowed to react with a (meth)acrylate-based monomer having a hydroxyl group such as 2-hydroxyethyl (meth)acrylate, 2-hydroxyethyl (meth)acrylate, and 2-hydroxypropyl (meth)acrylate. For example, a mixture of 100 parts of UNIDIC 17-806 (manufactured by DIC Corporation) and 1 part of Coronate L (manufactured by Nippon Polyurethane Industry Co., Ltd.) described in JP S59-151110 A is preferably used.

The ultraviolet curable polyester (meth)acrylate resin can be easily obtained by reacting a hydroxyl group and carboxyl group at the terminal of the polyester with a monomer such as 2-hydroxyethyl (meth)acrylate, glycidyl (meth)acrylate, and (meth)acrylic acid (for example, JP S59-151112 A).

The ultraviolet curable epoxy (meth) acrylate resin can be obtained by allowing a hydroxyl group at the terminal of the epoxy resin to react with a monomer such as (meth) acrylic acid, (meth)acrylic acid chloride, and glycidyl (meth)acrylate. Examples thereof may include UNIDIC V-5500 (manufactured by DIC Corporation).

The ultraviolet curable polyol (meth)acrylate resin is not particularly limited, and examples thereof may include ethylene glycol (meth) acrylate, polyethylene glycol di(meth) acrylate, glycerol tri(meth)acrylate, trimethylolpropane tri (meth)acrylate, pentaerythritol tri(meth)acrylate, pentaerythritol tetra(meth)acrylate, dipentaerythritol penta (meth)acrylate, dipentaerythritol hexa(meth)acrylate, and an alkyl-modified dipentaerythritol penta(meth)acrylate.

The thermosetting resin is not particularly limited, and examples thereof may include an inorganic material such as polysiloxane.

The resins described above may be used independently or as a mixture of two or more members thereof.

A hard coat agent can be obtained by curing the above resins. Examples of a curing method may include heat, and active energy ray irradiation, and the active energy ray irradiation is preferable from the viewpoint of curing temperature, curing time, cost or the like.

A hard coat agent can be provided; the active energy ray-curable resin is irradiated with an active energy ray; and the active energy ray-curable resin is cured through crosslinking reaction or the like.

[Other Additives]

It is possible to use a known additive in the hard coat layer if required. Examples of a preferred additive may include a dye or pigment that can absorb or reflect infrared rays.

The thickness of the hard coat is preferably from 1 to 10 μm and more preferably from 2 to 5 μm.

<Elastic Modulus of Each Layer>

In the constitution mentioned above, it is preferable to provide the difference in elastic modulus such that the elastic moduli of the infrared reflective layer (A), the resin adhesive layer (B), and the hard coat layer (C) are as follows.

$$\text{Low (soft)} A < B < C \text{ high (hard)} \qquad [\text{Math. 4}]$$

A resin adhesive layer is formed between an infrared reflective layer having a low elastic modulus and a hard coat having a high one, the resin adhesive layer has an intermediate elastic modulus; peeling of the film can be suppressed; and then an infrared shielding film haven better adhesion can be formed.

<Method of Measuring Elastic Modulus; Nano-Indentation Method>

The elastic modulus of the infrared reflective layer can be obtained by an elastic modulus measuring method known in the related art, and it is possible to measure by, for example, a method in which the elastic modulus is measured by using Vibron DDV-2 (manufactured by ORIENTEC Co., LTD.) under the condition of applying a constant strain at a constant frequency (Hz), a method in which the elastic modulus is determined by the measured value obtained when the applied strain is changed at a constant frequency after forming the infrared reflective layer on a transparent substrate by using RSA-II (manufactured by Rheometric Scientific, Inc.) as a measuring device, or a method in which the elastic modulus is measured by a nano-indenter applying the nano-indentation method, for example, by the nano-indenter (Nano Indenter TMXP/DCM) manufactured by MTS Systems Corporation.

There is a preferable method of measuring with a nano-indenter from the viewpoint that the elastic modulus of the significantly thin infrared reflective layer according to the invention can be measured with high accuracy. Herein, the "nano-indentation method" is a method of measuring elastic modulus (reduced modulus) that a triangular pyramid indenter having a tip radius of 0.1 to 1 μm with an ultralight load is indented in the infrared reflective layer as a measurement object in order to apply a load, and then returned so as to release a load; a load-displacement curve obtained is prepared; and the elastic modulus is measured by the applied load obtained from the load-displacement curve and the indentation depth. In this nano-indentation method, the elastic modulus can be measured with high accuracy of 0.01 nm as a displacement resolution with a head assembly having an ultralow load, for example, the maximum load of 20 mN and a load resolution of 1 nN.

With regard to the elastic modulus of the infrared reflective layer (A), it is preferable that the elastic modulus of at least one high refractive index layer or low refractive index layer which is in contact with the resin adhesive layer is lower than the elastic modulus of the resin adhesive layer (B).

In addition, the elastic moduli of the resin adhesive layer (B) and the hard coat layer (C) can also be measured by the nano-indentation method in the same manner as the infrared reflective layer (A).

<Method of Producing Light Reflective Film>

A production method of a light reflective film of the invention is not particularly limited, and any method can be used as long as it is possible to form a light reflective layer comprising a low refractive index layer and a high refractive index layer on a substrate.

In a production method of the light reflective film, an infrared shielding film will be also described as a representative example of the light reflective film although the invention is not limited to this.

<Method of Producing Infrared Shielding Film>

In one embodiment, the infrared shielding film can be produced as follows. A coating liquid for low refractive index layer and a coating liquid for high refractive index layer are alternately applied on a substrate and dried to form an infrared reflective layer; subsequently a coating liquid for resin adhesive layer is applied on the infrared reflective layer and dried to form a resin adhesive layer; and further a coating liquid for hard coat layer is applied on the resin adhesive layer, dried, and further irradiated with an active energy ray to form a hard coat layer.

Hereinafter, the substrate, the formation of the infrared reflective layer, the formation of the resin adhesive layer, and the formation of the hard coat layer will be separately described.

[Substrate]

A usable substrate can be used the same described above, and its explanation is omitted.

[Formation of Infrared Reflective Layer]

The infrared reflective layer is usually formed by alternately applying a coating liquid for low refractive index layer and a coating liquid for high refractive index layer on a substrate and drying.

(Coating Liquid for Low Refractive Index Layer)

A coating liquid for low refractive index layer usually comprises a water-soluble resin and a solvent, and comprises the first metal oxide particles, a protective agent, a curing agent, and other additives if required.

The water-soluble resin, the first metal oxide particles, the protective agent, the curing agent, and the other additives which are usable can be used the same described above and their explanations are omitted.

At this time, it is preferable to use an unmodified polyvinyl alcohol and a silanol-modified polyvinyl alcohol as the water-soluble resin. In the invention, the coating liquid is stable when comprising the silanol-modified polyvinyl alcohol, and the coating property of the coating film to be obtained can be improved as a result. Here, the state that a coating liquid is stable means that the coating liquid is stable over time.

An usable solvent is not particularly limited, and it is preferably water, an organic solvent, or a mixed solvent thereof. Specific examples thereof may include alcohols such as methanol, ethanol, 2-propanol, and 1-butanol; esters such as ethyl acetate, butyl acetate, propylene glycol monomethyl ether acetate, and propylene glycol monoethyl ether acetate; ethers such as diethyl ether, propylene glycol monomethyl ether, and ethylene glycol monoethyl ether; amides such as dimethylformamide, and N-methyl pyrrolidone; ketones such as acetone, methyl ethyl ketone, acetylacetone, and cyclohexanone. These solvents may be used independently or as a mixture of two or more members thereof. In terms of an environmental aspect and a simplicity of operation, a solvent used is preferably water or a mixed solvent of water and methanol or ethanol and it is more preferably to comprise 95% or more of water.

In one embodiment, as a coating liquid for a low refractive index layer, a polyvinyl alcohol-based resin is preferably used as the water-soluble resin. In this case, it is preferable to use a water-based solvent. The water-based solvent is preferable from the viewpoint of productivity and also environmental protection. In addition, it is preferable in a case where the above polyvinyl alcohol-based resin and water-based solvent are comprised since an interlayer mixing can be suppressed by setting a coating film after applying.

A preparation method of the coating liquid for low refractive index layer is not particularly limited, and examples thereof may include a method in which the water-soluble resin, and the first metal oxide particles, the protective agent, the curing agent, and the other additives to be added if required are added and mixed by stirring. At this time, the order for adding each of the components is also not particularly limited, and each of the components can be added sequentially and mixed while stirring, or added at once and mixed while stirring. Further solvent may be used in order to adjust for appropriate viscosity if required.

The concentration of the water-soluble resin in the coating liquid for low refractive index is preferably from 0.5 to 10% by mass. In addition, the concentration of the metal oxide particles in the coating liquid for low refractive index layer is preferably from 1 to 50% by mass.

(Coating Liquid for High Refractive Index Layer)

The coating liquid for high refractive index layer usually comprises a water-soluble resin and a solvent, and comprises the second metal oxide particles, a protective agent, a curing agent, and other additives if required.

At this time, it is preferable to comprise a modified polyvinyl alcohol as the water-soluble resin.

The protective agent, the curing agent and the other additives, and the solvent which are usable can be used the same and their explanations are omitted.

The coating liquid for high refractive index layer can be prepared by the same method as that of the coating liquid for low refractive index layer. At this time, it is preferable to previously prepare a dispersion of the second metal oxide particles in a case in which the coating liquid for high refractive index layer comprises the second metal oxide particles. In other words, it is preferable to prepare the coating liquid for high refractive index layer using the dispersion prepared by adding the second metal oxide particles (preferably, rutile type titanium oxide) having a volume average particle size of 100 nm or less and dispersing. At this time, the second metal oxide particles are more preferably titanium oxide particles covered with a silicon-containing hydrous oxide. The dispersion may be appropriately added so as to become an arbitrary concentration in each layer in the case of using the dispersion.

The concentration of the water-soluble resin in the coating liquid for high refractive index layer is preferably from 0.5 to 10% by mass. In addition, the concentration of the metal oxide particles in the coating liquid for high refractive index layer is preferably from 1 to 50% by mass.

(Coating and Drying)

The infrared reflective layer can be formed by applying the coating liquid for low refractive index layer and the coating liquid for high refractive index layer thus prepared on a substrate and drying. Specifically the following forms are exemplified: (1) A method of manufacturing an infrared shielding film, which the high refractive index layer is formed by applying the coating liquid for high refractive index layer on a substrate and drying, and then the low refractive index layer is formed by applying the coating liquid for low refractive index layer and drying; (2) a method of manufacturing an infrared shielding film, which the low refractive index layer is formed by applying the coating liquid for low refractive index layer on a substrate and drying, and then the high refractive index layer is formed by applying the coating liquid for high refractive index layer and drying; (3) a method of manufacturing an infrared shielding film comprising a high refractive index layer and a low refractive index layer, which the coating liquid for high refractive index layer and the coating liquid for low refractive index layer are alternately successively multilayer coated on a substrate, and then dried; and (4) a method of manufacturing an infrared shielding film comprising a high refractive index layer and a low refractive index layer, which the coating liquid for high refractive index layer and the coating liquid for low refractive index layer are simultaneously multilayer coated on a substrate and then dried. Among them, the preferred method is the method of (4) above since it is a simpler manufacturing process.

Viscosity of the coating liquid for high refractive index layer and the coating liquid for low refractive index layer at the time of performing the simultaneous multilayer coating are not particularly limited, and the viscosity at 45° C. is preferably from 5 to 100 mPa·s and even more preferably from 10 to 50 mPa·s in the case of using a slide bead coating method. In addition, the viscosity at 45° C. is preferably from 5 to 1200 mPa·s and even more preferably from 25 to 500 mPa·s in the case of using a curtain coating method.

In addition, the viscosity of the coating liquid at 15° C. is preferably 100 mPa·s or more, more preferably from 100 to 30,000 mPa·s, even more preferably from 3,000 to 30,000 mPa·s, and most preferably from 10,000 to 30,000 mPa·s.

The conditions of an applying and drying method is not particularly limited, and, for example, in the case of a successive coating method, either of the coating liquid for high refractive index layer or the coating liquid for low refractive index layer which has been heated at 30 to 60° C. is applied on a substrate and dried in order to form a layer, and then the other coating liquid is applied on this layer and dried; an infrared reflective layer is formed by repeating the number of times required for exhibiting the desired infrared shielding performance.

For example, it is preferable to use a coating method such as roll coating method, rod bar coating method, air knife coating method, spray coating method, curtain coating method, slide bead coating method using a hopper described in U.S. Pat. No. 2,761,419 and U.S. Pat. No. 2,761,791 and extrusion coating method.

A drying temperature is preferably 30° C. or higher. It is preferable to perform drying, for example, at a wet-bulb temperature of 5 to 50° C. and a film surface temperature of 30 to 100° C. (preferably from 10 to 50° C.). As a drying method, warm air drying, infrared drying, and microwave drying are used. Examples of a specific drying method may include a method to blow warm air at 40 to 60° C. for 1 to 5 seconds. In addition, drying may be performed by a single process or a multistage process; however, drying is preferably performed by the multistage process. In this case, it is more preferable to be the temperature of constant rate drying period<the temperature of decreasing rate drying period. The temperature range of the constant rate drying period is preferably set to from 30 to 60° C. and the temperature range of the decreasing rate drying period is preferably set to from 50 to 100° C.

A setting process may be performed after applying prior to drying. The setting process refers to a process of once cooling the coating film obtained by applying once before drying. The viscosity of the coating film can be increased by performing the setting process, or the fluidity of material between the layers and in each layer can be decreased by gelatinization. This prevents the interlayer mixing and thus the uniformity of coating film can be improved.

The temperature of the cold air in the setting process is preferably from 0 to 25° C. and more preferably from 5 to 10° C.

In addition, a time during which the coating film is exposed to the cold wind is preferably from 10 to 360 seconds, more preferably from 10 to 300 seconds, and even more preferably from 10 to 120 seconds although it depends on the carrying speed of the coating film.

A time until the completion of the setting process (setting time) is preferably 5 minutes or shorter and more preferably 2 minutes or shorter. It is preferable that the setting time is 5 minutes or shorter since the interlayer diffusion of the components (such as metal oxide particles) in the refractive index layers can be suppressed and thus the value of the refractive index difference between the high refractive index layer and the low refractive index layer can be increased. The setting time can be controlled by the way which a water-soluble resin and a member of additives such as metal oxide particles if required, and concentration thereof are appropriately adjusted. The term "completion of setting process" refers to a state in which the coating film component does not adhere to a finger when the surface of the coating film is pressed with a finger.

[Formation of Resin Adhesive Layer]

The resin adhesive layer is usually formed by applying a coating liquid for resin adhesive layer on the infrared reflective layer (low refractive index layer or high refractive index layer) and drying.

(Coating Liquid for Resin Adhesive Layer)

The coating liquid for resin adhesive layer comprises at least one member selected from the group consisting of polyvinyl acetal resins, acrylic resins, and urethane resins, and solvents; and it comprises metal oxide particles and other additives if required.

A polyvinyl acetal resin, acrylic resin, urethane resin, metal oxide particles, and other additives can be used as the same described above and their explanations are omitted.

A solvent is not particularly limited, and the same solvents as those used in the coating liquid for low refractive index layer and the coating liquid for high refractive index layer described above can be used.

The coating liquid for resin adhesive layer can comprise a polyvinyl acetal resin, an acrylic resin, and a urethane resin; the total amount of at least one resin selected from the group consisting of the above resins is preferably from 2 to 30% by mass.

(Coating and Drying)

The coating and drying method of the coating liquid for resin adhesive layer can be performed by the same method as that of the infrared reflective layer. Hence, the formation of the resin adhesive layer may be separately performed after the formation of the infrared reflective layer or may be simultaneously performed with the formation of the infrared reflective layer. It is preferable to separately perform the formation from the viewpoint of adhesive property. In other words, for example, in a case where the infrared reflective layer comprises 17 layers and a layer comprising infrared reflective layer-substrate-infrared reflective layer-resin adhesive layer with the simultaneous multi-layer application of 9 layers is formed, the simultaneous multi-layer application of 9 layers is primarily performed on the substrate by using the coating liquid for low refractive index layer and the coating liquid for high refractive index layer, and a laminate of 9 layers is formed by drying it; next, the simultaneous multi-layer application of 9 layers is performed on a surface on the opposite side of forming the laminate by using the coating liquid for low refractive index layer, the coating liquid for high refractive index layer, and the coating liquid for resin adhesive layer, and the surface is dried; a film laminated with the infrared reflective layer comprising 17 layers as the total of substrate and both surfaces, and the resin adhesive layer, can be manufactured.

[Formation of Hard Coat Layer]

The hard coat layer is usually formed by coating a coating liquid for hard coat layer, drying, and further heating and/or irradiating with an active energy ray.

(Coating Liquid for Hard Coat Layer)

The coating liquid for hard coat layer comprises an active energy ray-curable resin and a solvent. If required, the coating liquid may comprise a thermosetting resin and the like.

The same active energy ray-curable resin and thermosetting resin as those described above can be used and their explanations are omitted.

The solvent is not particularly limited, and methyl acetate, propylene glycol monomethyl ether, methyl ethyl ketone, ethyl acetate, and the like can be used.

The concentration of the active energy ray-curable resin which can be comprised in the coating liquid for hard coat layer is preferably from 50 to 95% by mass. At this time, in a case in which the coating liquid for hard coat layer comprises a thermosetting resin and the like together with the active energy ray-curable resin, it is preferable that the sum of the concentrations thereof is in the above range.

(Coating and Drying)

The coating method is not particularly limited, and a method such as a gravure coating method can be used.

The drying method is not particularly limited, and examples thereof may include the heating and the blowing of warm air.

The drying temperature is not particularly limited and is preferably from 30 to 110° C.

(Heating and Irradiation with Active Energy Ray)

The active energy ray-curable resin in the coating liquid for hard coat layer can become a hard coat agent since the active energy ray-curable resin undergoes a crosslinking or the like by being irradiated with an active energy ray (for example, an ultraviolet lamp).

In a case in which the coating liquid for hard coat layer further comprises a thermosetting resin, the thermosetting resin undergoes the crosslinking or the like by being heated and thus can become a hard coat agent. Meanwhile, the drying and heating may be performed at the same time by adjusting the temperature in the above drying stage in some cases.

The heating temperature at this time is preferably from 20 to 120° C. and more preferably from 50 to 100° C.

<Light Reflector>

The light reflective film provided by the invention can shield the light having a predetermined wavelength by controlling the optical film thickness and the like, and thus can be applied to various applications as a light reflector depending on the light to be shielded. Examples thereof may include an ultraviolet shield using an ultraviolet shielding film which reflects ultraviolet rays, a decorative body using a light colored film which reflects visible light, an infrared shield using an infrared shielding film which reflects infrared rays, and a decorative body using a metallic luster film that reflects the light of a predetermined wavelength.

In the following description as well, the infrared shield using an infrared shielding film as a representative example of the light reflective film will be described, but it is not intended to limit the invention.

<Infrared Shield>

The infrared shielding film provided by the invention is mainly used for the purpose of enhancing weather resistance, for example, a film for window such as infrared shielding film providing an infrared shielding effect, the infrared shielding film which is pasted to a facility such as outside of building window and vehicle window exposed to the sunlight for a long period; and a film for agricultural greenhouse.

In particular, it is suitable for a member where the infrared shielding film according to the invention is pasted, directly or via an adhesive, to abase substance such as glass or glass alternative resin.

In other words, according to still another embodiment of the invention, an infrared shield provided with the infrared shielding film according to the invention on at least one surface of a base substance, is provided.

FIG. 1 illustrates a schematic cross-sectional diagram illustrating a general structure of an infrared shield used in one embodiment of the invention. The infrared shielding film in FIG. 1 has an infrared reflective layer on one surface of the substrate. In other words, it has the substrate (comprising the undercoat layer)-infrared reflective layer-resin adhesive layer-hard coat layer.

The infrared shield 1 in FIG. 1 has the substrate 11, the undercoat layer 12 formed on the substrate 11, and the infrared reflective layer 13 formed on the undercoat layer 12. The infrared reflective layer 13 formed on the substrate 11 has a structure in which a low refractive index layer 14 and a high refractive index layer 15 are alternately laminated. More specifically, the multilayer product of 18 layers on one face (infrared reflective layer 13) has the following structure: the multilayer of 9 layers is formed by alternately laminating the low refractive index layer 14 of 5 layers and the high refractive index layer 15 of 4 layers as forming the low refractive index layer 14 on each of the bottom and the top layer of the substrate side; and furthermore, the multilayer of 9 layers is formed on the above multilayer by alternately laminating the low refractive index layer 14 of 5 layers and the high refractive index layer 15 of 4 layers so as to be the same formation.

In the present embodiment, a transparent hard coat layer (HC layer) 17 is formed on the low refractive index layer 14 of the top layer in the multilayer product of 18 layers (infrared reflective layer 13) on one surface of the substrate 11 (for example, the surface on the indoor side opposite to the side onto which sunlight L shines) via the resin adhesive layer 16. High adhesion can be obtained as the hard coat layer is pasted to the infrared reflective layer 13 via the resin adhesive layer 16. The transparent adhesive layer 18 is formed on the other surface of the substrate 11 (for example, the surface to be attached to a base substance 19 such as a vehicle window). In this case, the infrared shielding film 1 may be attached to the indoor (inside of a vehicle or room) side of the base substance 19 such as a vehicle window or a glass window of a building (the state after the infrared shielding film 1 is attached to the base substance 19 is illustrated in FIG. 1 as well).

In the present embodiment, the infrared reflective layer 13 may be formed directly on the substrate 11 without forming the undercoat layer 12 although an example of forming the undercoat layer 12 on one surface of the substrate 11. In addition, the transparent adhesive layer 18 is not necessarily required depending on the type of usage, and thus it is possible to have a structure without the transparent adhesive layer 18. Moreover, the transparent adhesive layer 18 may be formed on the hard coat layer (HC layer) 17. Furthermore, a releasing layer (not illustrated) is previously formed on the adhesive layer 18, and then the releasing layer may be peeled off at the time of attaching to the base substance 19. In the same manner, a releasing layer (not illustrated) is previously formed on the hard coat layer (HC layer) 17, and then the releasing layer may be peeled off after attaching to the base substance 19. In addition, other layers (for example, one or more functional layers such as conductive layer, antistatic layer, gas barrier layer, easy adhesive layer, antifouling layer, deodorant layer, drip layer, easily slipping layer, abrasion resistant layer, antireflection layer, electromagnetic wave shielding layer, ultraviolet light absorbing layer, infrared absorbing layer, print layer, fluorescent light-emitting layer, hologram layer, release layer, pressure sensitive adhesive layer, adhesive layer, infrared cut layer other than the high refractive index layer and the low refractive index layer of the invention (metal layer and liquid crystal layer), coloring layer (visible light absorbing layer), and intermediate film layer used in a laminated glass) may be used independently or in proper combination instead of the transparent adhesive layer 18.

FIG. 2 illustrates a schematic cross-sectional diagram illustrating a general structure of an infrared shield used in one embodiment of the invention. The infrared shielding film in FIG. 2 has infrared reflective layers on both surfaces of the substrate. In other words, it has the infrared reflective layer-substrate (comprising the undercoat layer)-infrared reflective layer-resin adhesive layer-hard coat layer.

FIG. 2 is a schematic cross-sectional diagram illustrating a general structure of an infrared shield used in another embodiment of the invention.

The infrared shielding film 1' in FIG. 2 has the substrate 11, the undercoat layers 12 formed on both surfaces of the substrate 11, and the infrared reflective layers 13 formed on the undercoat layers 12 on both surfaces of the substrate 11. Each of the infrared reflective layers 13 formed on both surfaces of the substrate 11 has a structure in which the low refractive index layer 14 and the high refractive index layer 15 are alternately laminated. More specifically, it has a structure in which the multilayer product of 9 layers (infrared reflective layer 13) formed by alternately laminating the low refractive index layer 14 of 5 layers and the high refractive index layer 15 of 4 layers is formed on each of both surfaces of the substrate 11 as forming the low refractive index layer 14 on each of the bottom layer and top layer of the substrate side.

In the present embodiment, the transparent hard coat layer (HC layer) 17 is formed on the low refractive index layer 14 of the top layer in the multilayer product of 9 layers (laminated unit 13) on one surface of the substrate 11 (for example, the surface on the indoor side opposite to the side onto which sunlight L shines) via the resin adhesive layer 16. High adhesion can be obtained as the infrared reflective layer 13 is pasted to the hard coat layer 17 via the resin adhesive layer 16. The transparent adhesive layer 18 is formed on the low refractive index layer 14 of the top layer in the multilayered product of 9 layers (laminated unit 13) on the other surface of the substrate 11 (for example, the surface to be attached to the base substance 19 such as a vehicle window). In this case, the infrared shielding film 1' may be attached to the indoor (inside of a vehicle or room) side of the base substance 19 such as vehicle window and glass window of a building (the state after the infrared shielding film 1' is attached to the base substance 19 is illustrated in FIG. 2).

In the present embodiment, the infrared reflective layer 13 may be formed directly on the substrate 11 without forming the undercoat layer 12 although an example of forming the undercoat layer 12 on one surface of the substrate 11. In addition, the transparent adhesive layer 18 is not necessarily required depending on the type of usage, and thus it is possible to have a structure without the transparent adhesive layer 18. Moreover, the transparent adhesive layer 18 may be formed on the hard coat layer (HC layer) 17. Furthermore, a releasing layer (not illustrated) is previously formed on the adhesive layer 18, and then the releasing layer may be peeled off at the time of attaching to the base substance 19. In the same manner, a releasing layer (not illustrated) is previously formed on the hard coat layer (HC layer) 17, and then the releasing layer may be peeled off after attaching to the base substance 19. In addition, other layers (for example, one or more functional layers such as conductive layer, antistatic layer, gas barrier layer, easy adhesive layer, antifouling layer, deodorant layer, drip layer, easily slipping layer, abrasion resistant layer, antireflection layer, electromagnetic wave shielding layer, ultraviolet light absorbing layer, infrared absorbing layer, print layer, fluorescent light-emitting layer, hologram layer, release layer, pressure sensitive adhesive layer, adhesive layer, infrared cut layer other than the high refractive index layer and the low refractive index layer of the invention (metal layer and liquid crystal layer), coloring layer (visible light absorbing layer), and intermediate film layer used in a laminated glass) may be used independently or in proper combination instead of the transparent adhesive layer 18.

The base substance usable in the present embodiment is not particularly limited, and examples thereof may include glass, a polycarbonate resin, a polysulfone resin, an acrylic resin, a polyolefin resin, a polyether resin, a polyester resin, a polyamide resin, a polysulfide resin, an unsaturated polyester resin, an epoxy resin, a melamine resin, a phenolic resin, a diallyl phthalate resin, a polyimide resin, a urethane resin, a polyvinyl acetate resin, a polyvinyl alcohol resin, a styrene resin, a vinyl chloride resin, a metal plate, and ceramics. The member of resin may be any of a thermoplastic resin, a thermosetting resin, and an ionizing radiation curable resin, and these may be used in combination of two or more members thereof.

The above base substance can be produced by a known method such as extrusion molding, calendar molding, injection molding, hollow molding, and compression molding.

The thickness of the base substance is not particularly limited and is preferably from 0.1 mm to 5 cm.

With regard to the adhesive layer or pressure sensitive adhesive layer to paste the infrared shielding film to the base substance, it is preferable to provide the infrared shielding film on the incident side of sunlight (heat ray). In addition, it is preferable that the infrared shielding film according to the invention is held between the window glass and the base substance so as to be sealed from the ambient gas such as moisture and to be excellent in durability.

As an adhesive agent applicable in the invention, it is possible to use an adhesive agent having a light curable or thermosetting resin as a main component.

An adhesive agent is preferably to exhibit durability to ultraviolet rays, and an acrylic pressure sensitive adhesive or a silicone-based pressure sensitive adhesive is preferable. Moreover, an acrylic pressure sensitive adhesive is preferable from the viewpoint of pressure sensitive adhesive characteristics and cost. The acrylic pressure sensitive adhesive is preferably solvent-based one in terms of easily controlling peel strength. In a case in which a solution polymerized polymer is used as an acrylic solvent-type adhesive, a known monomer can be used as the monomer thereof.

In addition, a polyvinyl butyral resin or an ethylene-vinyl acetate copolymer resin used as the intermediate layer of the laminated glass may be used. Specific examples thereof may include a plastic polyvinyl butyral (manufactured by SEKISUI CHEMICAL CO., LTD., Mitsubishi Monsanto Chemical Co., Ltd, and the like), an ethylene-vinyl acetate copolymer (manufactured by Du Pont, Takeda Pharmaceutical Company Limited, DURAMIN), and a modified ethylene-vinyl acetate copolymer (manufactured by TOSOH CORPORATION, Melthene G). Meanwhile, an ultraviolet absorbing agent, an antioxidant, an antistatic agent, a heat stabilizer, a lubricant, a filler, a coloring agent, an adhesion regulating agent and the like may be appropriately added to the adhesive layer and mixed.

With regard to the measurement of solar transmittance, solar reflectivity, emissivity, and visible light transmittance, (1) a spectral transmittance and a spectral reflectivity of various kinds of single-plate glass are measured with a spectrophotometer having a wavelength (300 to 2500 nm). In addition, an emissivity is measured with a spectrometer having a wavelength of from 5.5 to 50 μm. Meanwhile, the default value is used for the emissivity of float plate glass, polished plate glass, figured glass, and heat ray absorbing plate glass. (2) With regard to the calculation of solar transmittance, solar reflectivity, solar absorptivity, and corrected emissivity, the solar transmittance, the solar reflectivity, the solar absorptivity, and the normal emissivity are calculated according to JIS R 3106: 1998. The corrected emissivity is obtained by multiplying the coefficient according to JIS R 3107: 1998 by the normal emissivity. With regard to the calculation of thermal insulating property and solar heat shielding property, (1) a thermal resistance of a multiple glass is calculated by using the measured thickness value and the corrected emissivity according to JIS R 3209: 1998. However the gas thermal conductance in the hollow layer is calculated according to JIS R 3107: 1998 in a case of which the hollow layer exceeds 2 mm. (2) The thermal insulating property is determined by the resistance of heat transmission by adding the resistance of heat transfer to the thermal resistance of the multiple glass. (3) The solar heat shielding property is calculated by determining the solar radiation heat acquisition ratio according to JIS R 3106: 1998 and subtracting it from 1.

EXAMPLES

Hereinafter, the invention will be specifically described with reference to Examples; however, the invention is not limited thereto. Meanwhile, the term "part" used in Examples represents "parts by mass" unless otherwise specified.

Example 1

<Production of Infrared Shielding Film>

An infrared shielding film was produced as a light reflective film.

(Substrate)

As a substrate, a polyethylene terephthalate film (A4300, double-sided easy adhesive layer, thickness: 50 μm, length 200 m×width 210 mm, manufactured by TOYOBO CO., LTD.) was prepared.

(Infrared Reflective Layer)

A refractive index layer was formed by using a wet film forming method.

Coating Liquid for Low Refractive Index Layer

First, the coating liquid for low refractive index layer was prepared. Specifically, 430 parts of colloidal silica (10% by mass) (SNOWTEX OXS; manufactured by NISSAN CHEMICAL INDUSTRIES, LTD.), 150 parts of an aqueous solution of boric acid (3% by mass), 85 parts of water, 300 parts of polyvinyl alcohol (4% by mass) (JP-45; polymerization degree: 4500; saponification degree: 88 mol %; manufactured by JAPAN VAM & POVAL CO., LTD.), and 3 parts of a surfactant (5% by mass) (SOFTAZOLINE LSB-R; manufactured by Kawaken Fine Chemicals Co., Ltd.) were added in this order at 45° C. Thereafter, it was made to 1000 parts with pure water, and the coating liquid for low refractive index layer was prepared.

Coating Liquid for High Refractive Index Layer

Next, the coating liquid for high refractive index layer was prepared. Specifically, a dispersion of silica-modified titanium oxide particles was prepared in advance, and then a solvent and the like were added thereto.

The dispersion of the silica-modified titanium oxide particles was prepared as follows.

An aqueous solution of titanium sulfate was heated and hydrolyzed by a known method to obtain a titanium oxide hydrate. The titanium oxide hydrate thus obtained was suspended in water so as to obtain 10 L of an aqueous suspension ($TiO_2$ concentration: 100 g/L). To this, 30 L of an aqueous solution of sodium hydroxide (concentration of 10 mol/L) was added to this under stirring, and the temperature thereof was raised to 90° C. and aged for 5 hours. The solution thus obtained was neutralized with hydrochloric acid, filtered, and washed with water so as to obtain a base-treated titanium compound.

Next, the base-treated titanium compound was suspended in pure water so as to have a $TiO_2$ concentration of 20 g/L and stirred. Under stirring, an amount of 0.4 mol % citric acid was added relative to the amount of $TiO_2$. It was raised the temperature to 95° C., added concentrated hydrochloric acid so as to have the concentration of hydrochloric acid of 30 g/L, and stirred for 3 hours while maintaining the liquid temperature. Here, the pH and zeta potential of the liquid mixture thus obtained were measured, and a pH was 1.4 and a zeta potential was +40 mV. In addition, the particle size thereof was measured with Zetasizer Nano (manufactured by Malvern Instruments Ltd.), and a volume average particle size was 35 nm and the monodispersity was 16%.

In order to prepare a 10.0% by mass water-based dispersion liquid of titanium oxide sol, 1 kg of pure water was added to 1 kg of a 20.0% by mass water-based dispersion liquid of titanium oxide sol comprising rutile type titanium oxide particles.

To 0.5 kg of the above 10.0% by mass water-based dispersion liquid of titanium oxide sol, 2 kg of pure water was added and then heated to 90° C. Thereafter, 1.3 kg of an aqueous solution of silicic acid having a $SiO_2$ concentration of 2.0% by mass was gradually added thereto. The dispersion liquid thus obtained was heat treated in an autoclave at 175° C. for 18 hours, and further concentrated, thereby preparing a 20% by mass dispersion liquid (sol aqueous dispersion) of silica-modified titanium oxide particles comprising titanium oxide having a rutile type structure covered with $SiO_2$.

The coating liquid for high refractive index layer was prepared by adding a solvent and the like to the sol aqueous dispersion liquid of silica-modified titanium oxide particles prepared in the manner described above. Specifically, 320 parts of the sol aqueous dispersion liquid (20.0% by mass) of silica-modified titanium oxide particles, 120 parts of an aqueous solution of citric acid (1.92% by mass), 20 parts of a polyvinyl alcohol (10% by mass) (PVA-103, polymerization degree: 300, saponification degree: 99 mol %, manufactured by KURARAY CO., LTD.), 100 parts of an aqueous solution of boric acid (3% by mass), 350 parts of polyvinyl alcohol (4% by mass) (PVA-124, polymerization degree: 2400, saponification degree: 88 mol %, manufactured by KURARAY CO., LTD.), and 1 part of a surfactant (5% by mass) (SOFTAZOLINE LSB-R manufactured by Kawaken Fine Chemicals Co., Ltd.) were added at 45° C. in this order. Thereafter, it was made to 1000 parts with pure water, and the coating liquid for high refractive index layer was prepared.

Coating and Drying

The multilayer coating of 9 layers was performed on a substrate heated to 45° C. with a slide hopper coating apparatus which can perform the multilayer coating of 9 layers while maintaining the temperature of the coating liquid for low refractive index layer and the coating liquid for high refractive index layer at 45° C. At this time, the bottom layer and the top layer were the low refractive index layer, and the others were arranged in order that the low refractive index layer and the high refractive index layer were alternately laminated. The coating amount was adjusted such that the film thickness of the low refractive index layer in drying was 150 nm for each layer and the film thickness of the high refractive index layer in drying was 130 nm for each layer. Meanwhile, the above film thickness was confirmed by cutting the infrared shielding film thus produced and observing the cut surface thereof with an electron microscope. At this time, the interface was determined by the XPS profile in the thickness direction of $TiO_2$ contained in the layer obtained by using an XPS surface analyzer in a case in which it was not possible to clearly observe the interface between two layers.

Immediately after applying, it blew cold air at 5° C. for setting. At this time, the time (setting time) until the surface was touched with a finger and anything did not adhere to a finger was 5 minutes.

After setting was completed, it blew hot air at 80° C. and dried, and a multilayer coating product consisting of 9 layers was made.

The multilayer coating of 9 layers was further performed on the back surface (the substrate surface (back surface) on the side opposite to the substrate surface to which multilayer coating of 9 layers had been applied) of the above multilayer coating product of 9 layers.

A film comprising the infrared reflective layer (9-layer laminated)-substrate-infrared reflective layer (9-layer laminated) was obtained in this manner.

(Resin Adhesive Layer)

The resin adhesive layer was formed by the way which A 10.0% by mass ethanol solution of a polyvinyl acetal resin (BX-L, acetalization rate: 61 mol %, manufactured by SEKISUI CHEMICAL CO., LTD.) was applied on one surface of the infrared reflective layer obtained above in the coating amount where a film thickness after drying was 1 μm.

(Hard Coat Layer)

Coating Liquid for Hard Coat Layer

The hard coat layer was prepared by the way which 73 parts of pentaerythritol tri/tetraacrylate (NK ester A-TMM-3, manufactured by Shin-Nakamura Chemical Co., Ltd.), 5 parts of IRGACURE 184 (manufactured by Ciba Japan Co., Ltd.), 1 part of a silicone-based surfactant (KF-351A, manufactured by Shin-Etsu Chemical Co., Ltd.), 10 parts of propylene glycol monomethyl ether, 70 parts of methyl acetate, and 70 parts of methyl ethyl ketone were mixed, and the obtained liquid mixture was filtered through a polypropylene filter having a pore size of 0.4 μm.

Coating and Drying

The above coating liquid for hard coat layer was applied on the above resin adhesive layer with a micro gravure coater, and dried at a constant rate drying zone temperature of 50° C. and a decreasing rate drying zone temperature of 70° C. At this time, the applying amount was adjusted in order that a film thickness in drying was 3 μm.

Ultraviolet Irradiation

The coating film thus obtained was cured by using an ultraviolet lamp while performing nitrogen purge. The curing conditions were as follows; Oxygen concentration: 1.0% by volume or less; intensity of illumination: 100 mW/cm$^2$; and irradiance level: 0.2 J/cm$^2$.

The infrared shielding film thus obtained has a structure having infrared reflective film (9 layers)-substrate-infrared reflective film (9 layers)-resin adhesive layer-hard coat layer.

Example 2

The infrared shielding film was produced in the same manner as in Example 1 except that the polyvinyl acetal resin was changed to a 10.0% by mass aqueous solution of a polyvinyl acetal resin (KW-1, acetalization ratio: 9 mol %, manufactured by SEKISUI CHEMICAL CO., LTD.).

Example 3

The infrared shielding film was produced in the same manner as in Example 1 except that the polyvinyl acetal resin was changed to a 10.0% by mass aqueous solution of a polyvinyl acetal resin (KW-3, acetalization ratio: 30 mol %, manufactured by SEKISUI CHEMICAL CO., LTD.).

Example 4

The infrared shielding film was produced in the same manner as in Example 3 except that the aqueous solution of a polyvinyl acetal resin (KW-3, acetalization ratio: 30 mol %, manufactured by SEKISUI CHEMICAL CO., LTD.) was changed to a KW-1:KW-3=2:1 (mass ratio of solid matters) mixture (acetalization ratio: 16 mol %) of the aqueous solution of a polyvinyl acetal resin (KW-1, acetalization ratio: 10 mol %, manufactured by SEKISUI CHEMICAL CO., LTD.) and the aqueous solution of a polyvinyl acetal resin (KW-3, acetalization ratio: 30 mol %, manufactured by SEKISUI CHEMICAL CO., LTD.).

The infrared shielding film thus obtained has a structure having infrared reflective film (9 layers)-substrate-infrared reflective film (9 layers)-resin adhesive layer-hard coat layer.

Example 5

The infrared shielding film was produced in the same manner as in Example 3 except that the aqueous solution of a polyvinyl acetal resin (KW-3, acetalization ratio: 30 mol %, manufactured by SEKISUI CHEMICAL CO., LTD.) was changed to a BX-L:KW-3=1:1 (mass ratio of solid matters) mixture (acetalization ratio: 45 mol %) of a polyvinyl acetal resin (BX-L, acetalization ratio: 61 mol %, manufactured by SEKISUI CHEMICAL CO., LTD.) and the aqueous solution of a polyvinyl acetal resin (KW-3, acetalization ratio: 30 mol %, manufactured by SEKISUI CHEMICAL CO., LTD.).

The infrared shielding film thus obtained has a structure having infrared reflective film (9 layers)-substrate-infrared reflective film (9 layers)-resin adhesive layer-hard coat layer.

Example 6

The infrared shielding film was produced in the same manner as in Example 1 except that the polyvinyl acetal resin was changed to a 10.0% by mass emulsion aqueous solution of an acrylic resin (ARON A-106, manufactured by TOAGOSEI CO., LTD.).

Example 7

The infrared shielding film was produced in the same manner as in Example 1 except that the polyvinyl acetal resin was changed to a 10.0% by mass aqueous solution of an acrylic resin (JURYMER AT-210 manufactured by TOAGOSEI CO., LTD.).

Example 8

The infrared shielding film was produced in the same manner as in Example 1 except that a 10.0% by mass solution of ethyl acetate comprising an acrylic resin (UH-3900 manufactured by TOAGOSEI CO., LTD.) was used instead of the 10.0% by mass ethanol solution of a polyvinyl acetal resin.

Example 9

The infrared shielding film was produced in the same manner as in Example 1 except that the polyvinyl acetal resin was changed to a 10.0% by mass emulsion aqueous solution of a urethane resin (HYDRAN AP-40F manufactured by DIC Corporation).

Example 10

The infrared shielding film was produced in the same manner as in Example 3 except that 20% by mass colloidal silica particles (ST-OXS, NISSANCHEMICAL INDUSTRIES, LTD.) relevant to a polyvinyl acetal resin was added to the coating liquid for resin adhesive layer.

Example 11

(Substrate)

The same substrate as that used in Example 1 was prepared.

(Infrared Reflective Layer and Resin Adhesive Layer)

A coating liquid for low refractive index layer and a coating liquid for high refractive index layer were used the same as Example 1. On the other hand, a coating liquid for resin adhesive layer was used the same as Example 10.

Coating and Drying

The infrared reflective layer which is alternately laminated 9 layers of the low refractive index layer and the high refractive index layer in the same manner as Example 1 was formed on one surface of the substrate.

The multilayer coating of 9 layers was performed on the other surface of the substrate by using the coating liquid for resin adhesive layer used in Example 10 together with the coating liquid for low refractive index layer and the coating liquid for high refractive index layer. In other words, the resin adhesive layer and the infrared reflective layer were simultaneously formed. The multilayer coating of 9 layers was performed such that the outermost layer (the farthest layer from the substrate) was the resin adhesive layer. After that, drying was performed in the same manner as above.

(Hard Coat Layer)

The hard coat layer was formed on the resin adhesive layer in the same manner as Example 1.

The infrared shielding film thus obtained has a structure having infrared reflective film (9 layers)-substrate-infrared reflective film (9 layers)-resin adhesive layer-hard coat layer.

Example 12

The infrared shielding film was produced in the same manner as Example 11 except that the multilayer coating of 9 layers in which the resin adhesive layer and the infrared reflective layer were simultaneously formed was changed to the multilayer coating of 10 layers.

The infrared shielding film thus obtained has a structure having infrared reflective film (9 layers)-substrate-infrared reflective film (9 layers)-resin adhesive layer-hard coat layer.

Example 13

The infrared shielding film was produced in the same manner as Example 12 except that a zirconium compound (AZ-COTE 5800MT manufactured by SAN NOPCO LIMITED) was further added to the resin adhesive layer of Example 12 at 0.25% by mass relative to the polyvinyl acetal resin.

Example 14

The infrared shielding film was produced in the same manner as Example 3 except that the multilayer coating of 9 layers was changed to the multilayer coating of 21 layers.

The infrared shielding film thus obtained has a structure having infrared reflective film (21 layers)-substrate-infrared reflective film (21 layers)-resin adhesive layer-hard coat layer.

Example 15

(Substrate)

The same substrate as that used in Example 1 was prepared.

(Infrared Reflective Layer)

The refractive index layer was formed by extrusion molding of a resin.

Specifically, in accordance with the melt extrusion method described in U.S. Pat. No. 6,049,419, TN8065S (manufactured by TEIJIN LIMITED) of polyethylene naphthalate (PEN) and ACRYPET VH (manufactured by Mitsubishi Rayon Co., Ltd.) of a polymethyl methacrylate (PMMA) resin were melted at 300° C. and laminated on the substrate by extrusion. Subsequently, it was vertically and horizontally stretched by about three times so as to be PMMA (152 nm)/PEN (137 nm)) 64/(PMMA (164 nm)/PEN (148 nm)) 64/(PMMA (177 nm)/PEN (160 nm)) 64/(PMMA (191 m)/PEN (173 nm)) 64 in order from the substrate, and then heat fixation and cooling were performed, whereby 256 layers were alternately laminated in total. Here, in the above layer structure, for example, the "(PMMA (152 nm)/PEN (137 nm)) 64" means that a unit formed by laminating PMMA having a film thickness of 152 nm and PEN having a film thickness of 137 nm in this order was laminated to be 64 units.

(Resin Adhesive Layer and Hard Coat Layer)

The infrared shielding film was formed in the same manner as Example 3 except using the present infrared reflective film as the infrared reflective layer.

The infrared shielding film thus obtained has a structure having substrate-infrared reflective film (256 layers)-resin adhesive layer-hard coat layer.

Example 16

<Production of Ultraviolet Shielding Film>

An ultraviolet shielding film was produced as a light reflective film.

Specifically, the ultraviolet shielding film was produced in the same manner as Example 3 except that the film thickness in drying was adjusted to be that the low refractive index layer was 70 nm for each layer and the high refractive index layer was 50 nm for each layer in the formation of the infrared reflective layer in Example 3.

The ultraviolet shielding film thus obtained has a structure having ultraviolet reflective film (9 layers)-substrate-ultraviolet reflective film (9 layers)-resin adhesive layer-hard coat layer.

Comparative Example 1

The infrared shielding film was produced in the same manner as Example 1 except that the polyvinyl acetal resin was changed to a 10.0% by mass emulsion of a vinyl acetate resin (VINYBLAN 4018 manufactured by Nissin Chemical Co., Ltd.).

Comparative Example 2

The infrared shielding film was produced in the same manner as Example 1 except that the resin adhesive layer was not formed.

Comparative Example 3

The infrared shielding film was produced in the same manner as Example 10 except that the hard coat layer was formed by heating at 80° C. for 1 minute by using KP-86 (manufactured by Shin-Etsu Chemical Co., Ltd.) of a thermosetting resin.

<Evaluation of Infrared Shielding Film>

[Infrared Transmittance and Visible Light Transmittance]

The transmittance of each infrared shielding film in the region of 300 nm to 2000 nm was measured by using a spectrophotometer (using an integrating sphere, U-4000 type manufactured by Hitachi, Ltd.). The transmittance value at 550 nm was used as the visible light transmittance and the transmittance value at 1200 nm was used as the infrared transmittance, respectively.

The results thus obtained are presented in Table 1-1 and Table 1-2 described below.

[Adhesive Property]

The peeling of the infrared reflective layer and the hard coat layer was confirmed in conformity to JIS K5600-5-6 (1999) (cross-cut method). The adhesive property was evaluated according to the following criteria.

⊙: peeling is not observed at all.
○: peeling is observed in the area of 5% or less with respect to the entire adhesive surface.
Δ: peeling is observed in the area of more than 5% and 35% or less with respect to the entire adhesive surface.
x: peeling is observed in the area of more than 35% with respect to the entire adhesive surface.

The results thus obtained are presented in Table 1-1 and Table 1-2 described below.

[Transparency (Haze Value)]

The haze value was measured by using a haze meter (NDH2000 manufactured by NIPPON DENSHOKU INDUSTRIES Co., LTD.). The evaluation was performed according to the following criteria.

○: 1% or less
Δ: more than 1% and 3% or less
x: more than 3%.

The results thus obtained are presented in Table 1-1 and Table 1-2 described below.

[Durability (1)]

The infrared shielding film was attached to the inside of a window using an acrylic adhesive and left to stand in an environment of 60° C. and 90% RH. Two months later, the infrared shielding film was visually observed and evaluated according to the following criteria. Meanwhile, there is a tendency that the transparency is deteriorated and thus the vision is blurred in a case in which the adhesive property of the infrared reflective layer and the hard coat layer is deteriorated.

⊙: there is no problem to see outside.
○: vision is partly blurred a little to see outside (no problem for practical use).
x: vision is totally blurred to see outside.

The results thus obtained are presented in Table 1-1 and Table 1-2 described below.

[Durability (2)]

The infrared shielding film was attached to the inside of a window using an acrylic adhesive and left to stand in an environment of 43° C. and 50% RH. Six months later, the infrared shielding film was visually observed and evaluated according to the following criteria. Meanwhile, there is a tendency that the transparency is deteriorated and thus the vision is blurred in a case in which the adhesive property of the infrared reflective layer and the hard coat layer is deteriorated.

⊙: there is no problem to see outside.
○: vision is partly blurred a little to see outside (no problem for practical use).
x: vision is totally blurred to see outside.

The results thus obtained are presented in Table 1-1 and Table 1-2 described below.

TABLE 1-1

| | Total number of infrared reflective layer | Resin adhesive layer | | | Hard coat layer Material | Evaluation | | | | | |
|---|---|---|---|---|---|---|---|---|---|---|---|
| | | Material | Acetalization ratio (%) | Additives | | Infrared transmittance (%) | Visible light transmittance (%) | Adhesive property | Transparency (haze) | Durability (1) | Durability (2) |
| Example 1 | 9 + 9 | Polyvinyl acetal resin | 61 | — | Ultraviolet curable resin | 17 | 72 | ○ | Δ | ○ | ○ |
| Example 2 | 9 + 9 | Polyvinyl acetal resin | 9 | — | Ultraviolet curable resin | 13 | 75 | ○ | Δ | ○ | ○ |
| Example 3 | 9 + 9 | Polyvinyl acetal resin | 30 | — | Ultraviolet curable resin | 10 | 78 | ○ | ○ | ○ | ○ |
| Example 4 | 9 + 9 | Polyvinyl acetal resin | 16 | — | Ultraviolet curable resin | 12 | 77 | ○ | ○ | ○ | ○ |
| Example 5 | 9 + 9 | Polyvinyl acetal resin | 45 | — | Ultraviolet curable resin | 13 | 77 | ○ | ○ | ○ | ○ |
| Example 6 | 9 + 9 | Acrylic resin | — | — | Ultraviolet curable resin | 16 | 75 | Δ | Δ | ○ | ○ |
| Example 7 | 9 + 9 | Acrylic resin | — | — | Ultraviolet curable resin | 13 | 78 | Δ | Δ | ○ | ○ |
| Example 8 | 9 + 9 | Acrylic resin | — | — | Ultraviolet curable resin | 20 | 70 | Δ | Δ | Δ | Δ |
| Example 9 | 9 + 9 | Urethane resin | — | — | Ultraviolet curable resin | 12 | 76 | Δ | Δ | ○ | ○ |

TABLE 1-2

| | Total number of infrared reflective layer | Resin adhesive layer | | | Hard coat layer Material | Evaluation | | | | | |
|---|---|---|---|---|---|---|---|---|---|---|---|
| | | Material | Acetalization ratio (%) | Additives | | Infrared transmittance (%) | Visible light transmittance (%) | Adhesive property | Transparency (haze) | Durability (1) | Durability (2) |
| Example 10 | 9 + 9 | Polyvinyl acetal resin | 30 | Colloidal silica | Ultraviolet curable resin | 9 | 80 | ○ | ○ | ⊙ | ○ |
| Example 11 | 9 + 8 | Polyvinyl acetal resin | 30 | Colloidal silica | Ultraviolet curable resin | 11 | 80 | ○ | ○ | ⊙ | ○ |
| Example 12 | 9 + 9 | Polyvinyl acetal resin | 30 | Colloidal silica | Ultraviolet curable resin | 15 | 78 | ○ | ○ | ⊙ | ○ |
| Example 13 | 9 + 9 | Polyvinyl acetal resin | 30 | Colloidal silica and zirconium compound | Ultraviolet curable resin | 13 | 78 | ⊙ | ○ | ⊙ | ○ |
| Example 14 | 21 + 21 | Polyvinyl acetal resin | 30 | — | Ultraviolet curable resin | 8 | 77 | ○ | ○ | ○ | ○ |
| Example 15 | 256 | Polyvinyl acetal resin | 30 | — | Ultraviolet curable resin | 10 | 77 | Δ | ○ | Δ | Δ |
| Example 16 | 9 + 9 | Polyvinyl acetal resin | 30 | — | Ultraviolet curable resin | — | — | ○ | ○ | ○ | ○ |
| Comparative Example 1 | 9 + 9 | Vinyl acetate resin | — | — | Ultraviolet curable resin | 25 | 65 | X | X | X | X |
| Comparative Example 2 | 9 + 9 | — | — | — | Ultraviolet curable resin | 16 | 79 | X | Δ | X | X |
| Comparative Example 3 | 9 + 9 | Polyvinyl acetal resin | 30 | Colloidal silica | Thermosetting resin | 10 | 75 | X | Δ | X | X |

As it is also apparent from the results of Table 1, it has been found that the infrared reflective layer and the hard coat layer exhibit high adhesive property by pasting the infrared reflective layer and the hard coat layer via the resin according to the invention.

In addition, in the comparison between Examples 1 to 9 and Comparative Example 2, the infrared transmittance, visible light transmittance and the like exhibit the same performance as those of Comparative Example 2 having no resin adhesive layer even though the resin adhesive layer is formed. Consequently, it has been found that the resin adhesive layer does not exhibit an adverse effect on the infrared transmittance and visible light transmittance of the infrared shielding film.

REFERENCE SIGNS LIST

1 and 1' infrared shielding film,
11 substrate,
12 undercoat layer,
13 laminated unit,
14 low refractive index layer,
15 high refractive index layer,
16 resin adhesive layer,
17 hard coat layer,
18 transparent adhesive layer,
19 base substance, and
L sunlight.

The invention claimed is:

1. A light reflective film comprising: laminated layers of a light reflective layer comprising a high refractive index layer and a low refractive index layer, a resin adhesive layer, and a hard coat layer on a substrate in this order:
    wherein the hard coat layer comprises a resin composition cured by irradiated with an active energy ray,
    the resin adhesive layer comprises at least one member selected from the group consisting of polyvinyl acetal resins, acrylic resins, and urethane resins,
    the resin adhesive layer further comprises metal oxide particles and a zirconium compound, and
    the zirconium compound comprises $ZrOCl_2$, $ZrO(OH)Cl$, $ZrO(NO_3)_2$, $(NH_4)_2Zr(OH)_2(CO_3)_2$, or $ZrO(C_2H_3O_2)_2$.

2. The light reflective film according to claim 1, wherein the resin adhesive layer comprises a polyvinyl acetal resin.

3. The light reflective film according to claim 2, wherein an acetalization ratio of the polyvinyl acetal resin is from 15 to 50 mol %.

4. A light reflector comprising a base substance and the light reflective film set forth in claim 1 disposed on at least one surface of the base substance.

5. The light reflective film according to claim 1, wherein the metal oxide particle comprised in the resin adhesive layer comprises at least one of silicon dioxide and alumina.

6. The light reflective film according to claim 1, wherein the resin adhesive layer further comprises heat ray-absorbing particles.

7. The light reflective film according to claim 6, wherein the heat ray-absorbing particles comprise at least one member selected from the group consisting of tin oxide, zinc oxide, titanium oxide, tungsten oxide, and indium oxide.

8. The light reflective film according to claim 7, wherein the heat ray-absorbing particles comprise at least one member selected from the group consisting of aluminum-doped tin oxide particles, indium-doped tin oxide particles, antimony-doped tin oxide (ATO) particles, gallium-doped zinc oxide (GZO) particles, indium-doped zinc oxide (IZO) particles, aluminum-doped zinc oxide (AZO) particles, niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide (ITO) particles, tin-doped zinc oxide particles, and silicon-doped zinc oxide particles.

9. The light reflective film according to claim 1, wherein the thickness of the resin adhesive layer is from 0.3 to 3 μm.

10. The light reflective film according to claim 1, wherein when the elastic modulus of the high refractive index layer or low refractive index layer in contact with the resin adhesive layer in the light reflective film, the resin adhesive layer and the hard coat layer is respectively defined as A, B and C, a definition of A<B<C is fulfilled.

11. The light reflective film according to claim 1, wherein the hard coat layer comprises a resin composition cured by irradiated with ultraviolet rays.

12. The light reflective film according to claim 1, wherein the light reflective film shields infrared rays.

13. The light reflective film according to claim 12, wherein the light reflective layer is an infrared reflective layer.

14. The light reflective film according to claim 13, wherein the transmittance in the visible light region is 50% or more; and the light reflective film has a region where a reflectivity exceeds 50% in the wavelength region of 900 nm to 1400 nm.

* * * * *